United States Patent
Ormazabal

(10) Patent No.: US 7,853,996 B1
(45) Date of Patent: Dec. 14, 2010

(54) METHODOLOGY, MEASUREMENTS AND ANALYSIS OF PERFORMANCE AND SCALABILITY OF STATEFUL BORDER GATEWAYS

(75) Inventor: Gaston S. Ormazabal, New York, NY (US)

(73) Assignee: Verizon Services Corp., Ashburn, VA (US)

( * ) Notice: Subject to any disclaimer, the term of this patent is extended or adjusted under 35 U.S.C. 154(b) by 1083 days.

(21) Appl. No.: 11/093,699

(22) Filed: Mar. 30, 2005

Related U.S. Application Data

(63) Continuation-in-part of application No. 10/678,328, filed on Oct. 3, 2003, now Pat. No. 7,421,734, and a continuation-in-part of application No. 10/679,222, filed on Oct. 3, 2003, and a continuation-in-part of application No. 10/678,779, filed on Oct. 3, 2003, now Pat. No. 7,076,393.

(51) Int. Cl.
*G06F 17/00* (2006.01)
(52) U.S. Cl. ........................................ 726/11
(58) Field of Classification Search ................. 726/11, 726/12; 713/153
See application file for complete search history.

(56) References Cited

U.S. PATENT DOCUMENTS

| | | |
|---|---|---|
| 5,414,704 A | 5/1995 | Spinney |
| 5,465,286 A | 11/1995 | Clare et al. |
| 5,473,607 A | 12/1995 | Hausman et al. |
| 5,828,653 A | 10/1998 | Goss |
| 5,859,980 A | 1/1999 | Kalkunte |
| 5,909,686 A | 6/1999 | Muller et al. |
| 5,936,962 A | 8/1999 | Haddock et al. |
| 5,991,270 A | 11/1999 | Zwan et al. |
| 6,154,775 A | 11/2000 | Coss et al. |
| 6,175,902 B1 | 1/2001 | Runaldue et al. |
| 6,680,089 B2 | 1/2004 | Miyake et al. |
| 6,701,346 B1 | 3/2004 | Klein |
| 6,707,817 B1 | 3/2004 | Kadambi et al. |

(Continued)

OTHER PUBLICATIONS

Rosenberg et al., "SIP:Session Intiation Protocol", Internet Engineering Task Force, Request for Comments 3261, Jun. 2002.

(Continued)

*Primary Examiner*—Ellen Tran

(57) ABSTRACT

Methods and apparatus for testing of Internet-Protocol packet network perimeter protection devices, e.g., Border Gateways such as Session Border Controllers, including dynamic pinhole capable firewalls are discussed. Analysis and testing of these network perimeter protection devices is performed to evaluate the ability of such device to perform at carrier class levels. The efficiency of state look table functions as well as call signaling processing capacity, implemented in a particular perimeter protection device, are determined and evaluated. Proper performance and efficiency of such perimeter protection devices are evaluated as a function of incoming call rate and as a function of total pre-existing active calls. Various different network perimeter protection devices, e.g., of different types and/or from different manufactures, can be benchmarked for suitability to carrier class environments and comparatively evaluated. Test equipment devices, e.g., enhanced Integrated Intelligent End Points (IIEPs), for fault testing, evaluating and stressing the network perimeter protection devices in a system environment are described. Typically these specialized test devices are used in pairs, one on each side of the firewall under test. These test equipment devices include a heavy duty traffic generator module, monitoring and analysis capability including a CPU utilization analysis module, and a graphical output capability.

21 Claims, 11 Drawing Sheets

U.S. PATENT DOCUMENTS

| | | |
|---|---|---|
| 6,826,616 B2 | 11/2004 | Larson et al. |
| 6,880,089 B1 * | 4/2005 | Bommareddy et al. ........ 726/11 |
| 6,920,107 B1 | 7/2005 | Qureshi et al. |
| 7,007,299 B2 * | 2/2006 | Ioele et al. .................... 726/14 |
| 7,072,291 B1 | 7/2006 | Jagadeesan et al. |
| 7,076,393 B2 | 7/2006 | Ormazabal et al. |
| 7,340,166 B1 | 3/2008 | Sylvester et al. |
| 7,421,734 B2 | 9/2008 | Ormazabal et al. |
| 7,440,573 B2 | 10/2008 | Lor et al. |
| 7,499,405 B2 | 3/2009 | Gilfix et al. |
| 7,672,336 B2 | 3/2010 | Bharrat et al. |
| 7,721,091 B2 | 5/2010 | Iyengar et al. |
| 2002/0083187 A1 | 6/2002 | Sim et al. |
| 2002/0112073 A1 | 8/2002 | MeLampy et al. |
| 2003/0055931 A1 | 3/2003 | Cravo De Almeida et al. |
| 2003/0076780 A1 | 4/2003 | Loge et al. |
| 2003/0086425 A1 | 5/2003 | Bearden et al. |
| 2003/0093563 A1 | 5/2003 | Young et al. |
| 2003/0115321 A1 | 6/2003 | Edminson et al. |
| 2003/0126464 A1 | 7/2003 | McDaniel et al. |
| 2003/0135639 A1 | 7/2003 | Marejka et al. |
| 2003/0165136 A1 | 9/2003 | Cornelius et al. |
| 2003/0195861 A1 | 10/2003 | McClure et al. |
| 2004/0028035 A1 | 2/2004 | Read |
| 2004/0039938 A1 | 2/2004 | Katz et al. |
| 2004/0068668 A1 | 4/2004 | Lor et al. |
| 2004/0133772 A1 | 7/2004 | Render |
| 2004/0136379 A1 | 7/2004 | Liao et al. |
| 2004/0208186 A1 | 10/2004 | Eichen et al. |
| 2004/0244058 A1 | 12/2004 | Carlucci et al. |
| 2005/0018618 A1 | 1/2005 | Mualem et al. |
| 2005/0050377 A1 | 3/2005 | Chan et al. |
| 2005/0076235 A1 | 4/2005 | Ormazabal et al. |
| 2005/0165917 A1 | 7/2005 | Le et al. |
| 2005/0232229 A1 | 10/2005 | Miyamoto et al. |
| 2006/0075084 A1 | 4/2006 | Lyon |
| 2006/0077981 A1 | 4/2006 | Rogers |
| 2006/0146792 A1 | 7/2006 | Ramachandran et al. |
| 2006/0227766 A1 | 10/2006 | Mickle et al. |
| 2007/0022479 A1 | 1/2007 | Sikdar et al. |
| 2007/0110053 A1 | 5/2007 | Soni et al. |
| 2007/0118894 A1 | 5/2007 | Bhatia |
| 2007/0121596 A1 | 5/2007 | Kurapati et al. |
| 2007/0192863 A1 | 8/2007 | Kapoor et al. |
| 2008/0037447 A1 | 2/2008 | Garg et al. |

OTHER PUBLICATIONS

Kuthan, J., et al., "Middlebox Communication: Framework and Requirements," Internet Engineering Task Force, draft-kuthanmidcom-framework-00.txt, Nov. 2000, pp. 1-23.

* cited by examiner

| FIGURE 3A |
| FIGURE 3B |

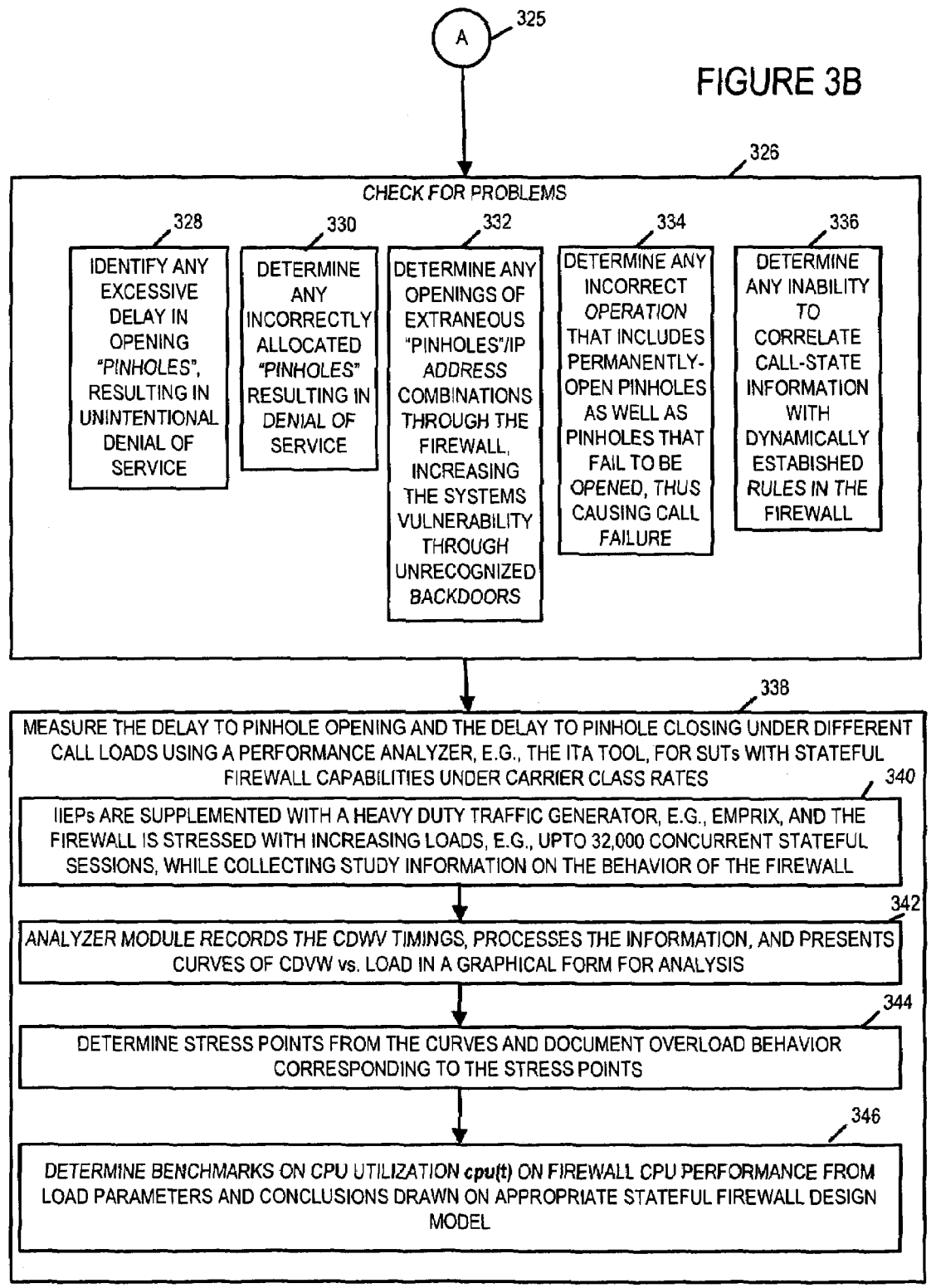

METHODOLOGY, MEASUREMENTS AND ANALYSIS OF PERFORMANCE AND SCALABILITY OF STATEFUL BORDER GATEWAYS

RELATED APPLICATIONS

This application is a continuation-in-part of U.S. patent application Ser. No. 10/678,328 filed Oct. 3, 2003 now U.S. Pat. No. 7,421,734; a continuation-in-part of pending U.S. patent application Ser. No. 10/679,222 filed Oct. 3, 2003; and a continuation-in-part of U.S. patent application Ser. No. 10/678,779 filed Oct. 3, 2003 now U.S. Pat. No. 7,076,393, each of which is hereby expressly incorporated by reference.

FIELD OF THE INVENTION

The present invention relates generally to the field of communications and, in particular, to methods and apparatus for testing and evaluating various security and performance aspects of firewall devices used in packet networks.

BACKGROUND

Some local telecommunications service providers have begun programs for the delivery of advanced voice and data services over IP that will require the implementation of security measures in order to protect both the service providing network assets as well as the customer networks from service affecting malicious intrusions that can cause either network losses or customer grievances. Additionally, the changing paradigm in the area of new services makes it beneficial for such a service provider to position itself ahead of its competitors by being the first to offer the new services afforded by the transformation from a switch based network to an IP based network. Common to both of these efforts are the challenges that are faced by a large size telecommunications service provider namely the impact on scalability and performance.

Security and performance are typically a zero sum game since improved security often results in reduced throughput and performance. This is the case in the area of perimeter protection of customer and network assets as well as in the development of new multimedia and multi-technology services for millions of customers. These challenges are manifested most tellingly in the deployment of a Softswitch infrastructure that will facilitate a telecommunication service provider achieving a position as "first to market" advanced services. Securing the Softswitch assets from potential attack by a malicious intruder is a vitally important component to consider in future IP based networks and services. A security failure in this realm can be extremely costly to the telecommunication service provider both in real economic terms as well as in reputation. The security capability, however, should be implemented in a scalable manner.

Interconnection of large-scale IP networks presents new twists to security challenges that can benefit from added perimeter protection measures. Distinct from traditional data, broadband, Voice over Internet Protocol (VoIP) and multimedia services are interactive, utilize separate signaling and transport flows, and place unique Quality of Service (QoS) and security requirements on the network that take into account users and policies derived from signaling and downstream network topology. Carrier-to-carrier VoIP peering, Hosed IP Centex and other multimedia packet-based services present new challenges for IP networks and edge networking technologies. These services are to be delivered between different IP network "islands" traversing borders between carrier and customer and carrier-to-carrier often between private and public networks. Carriers are confronted with deployment barriers such as security, service level assurance and Network Address Translation (NAT) traversal. Layer 3 and 5 (application) security enhancements are difficult to implement, either because of the inherent very-distributed nature of VoIP networks (many hops), or because they involve the use of digital certificate-based key systems which are notoriously difficult to manage, especially, at the carrier class scale of a network of a typical local service provider's size. An alternative is to protect crucial network assets such as the Softswitch infrastructure components, namely media gateways, signaling gateways, and application servers, through the use of network perimeter protection devices that will block potentially nefarious unwanted traffic from ever reaching those assets.

The network edge has evolved to be not only an access point but also a demarcation point and identifies the boundary of trust between the carrier's service network and its external customers and peers. The state of the art in VoIP security today is centered on the protection of these network "borders". These border devices, of necessity, need to implement firewall capabilities in both stateless and stateful modes thereby introducing new challenges for carrier class implementations, as stateful modes carry the burden of being extremely consumptive of CPU cycles for the devices performing the function.

In VoIP, the ports used to carry the media part of the call, are dynamically assigned through signaling, taken down upon call termination, and reused for a subsequent call at a later time. This technology is denominated "dynamic pinhole filtering" as firewalls need to filter traffic dynamically by opening/closing ports (pinholes) depending on the state and progress of a call. The correct implementation of this technology, at the network edge, provides indeed a good level of protection at a level of granularity not otherwise achievable with other current security technologies.

At least one local service provider is currently involved in major projects that should involve the eventual deployment of this stateful capability of "dynamic pinhole filtering". Value Added Data Security Services (VADSS) may include such things as stateful pinhole filtering and the provisioning of VADSS capabilities to customers from a network's edge and can be provided as a value-added revenue generating service. Another application could involve the large scale deployment of a Softswitch that will provide customers with hosted VoIP based services and advanced features. One of the possible devices considered for the security architecture of a Softswitch infrastructure is a Session Border Controller (SBC). Such SBCs would include, as an important component, the capability of stateful packet filtering for the media streams. These SBCs with stateful packet filtering would be used in place of conventional devices that perform Network Address Translation (NAT) techniques, but do not include a dynamic filtering capability.

A major issue of concern associated with the testing of this dynamic stateful filtering capability, for both of these potential services, is the verification of its performance at the rates demanded by a carrier class network, namely Gigabit-Ethernet (GigE) interfaces with typical concurrent sessions of the order of up to 100K or higher. It would be beneficial for service providers to develop the methodology and the integrated tools to perform testing of stateful capable "dynamic pinhole filtering" for evaluating functional operation and performance of firewalls at carrier class traffic levels.

Value Added Data Security Services will now be described. Value Added Data Security Services (VADSS) may be implemented as a suite of network-bases services that complement and add value to the basic capabilities of a local carrier's network-based IP-Virtual Private network (VPN) service and, represent a novel way of revenue generation. An exemplary VADSS service suite includes:

- Virtualized firewall providing basic stateful firewall-customer-configurable rule sets for packet filtering, and full stateful firewall with dynamic pinhole filtering to protect customer assets from threats outside their network
- Internet Offload—an Internet access capability directly from the IP/MPLS infrastructure; and
- IPSec tunnel terminations The ability of VADDS to provide security services and Internet access from within a provider network is what distinguishes VADSS from similar offerings that depend on managed Customer Premise Equipment (CPE). By leveraging the economies of scale of platforms capable of running multiple instances of such applications as firewalls, a local service provider can offer these virtualized services at the Service Edge Router level. Internet threats are kept at arm's length, away from the customer access link through network-based firewalls and address translation within the provider infrastructure. VADDS could include the provisioning of virtualized firewalls, each supporting a host of stateless protocols, as well as Application Layer Gateway capabilities for SIP, H.323, Skinny, and MGCP, at GigE rates and supporting 100K concurrent sessions.

Session Border Controllers for Softswitch Infrastructure will now be described. Existing edge functions such as aggregation, class based queuing and packet marking, address translation, security and admission control are insufficient to meet the requirements for the new Softswitch based VoIP services. In addition to these traditional edge functions, VoIP and multimedia services present new requirements on the network edge including QoS and bandwidth theft protection, inter-working of incompatible signaling networks, Lawful intercept, e.g., anonymous replication & forwarding of packets, and most significantly, the capability to perform stateful packet inspection, e.g., for voice streams, also called "dynamic packet filtering", at carrier-class rates. The service delivery network should be augmented with solutions that address these unique requirements. The existing edge router, complemented by a new class of product called a Session Border Controller (SBC), become the border element in the next generation network (NGN) architecture.

Session Border Controllers are a new category of network equipment designed to complement existing IP infrastructures, to deliver critical control functions to enable high quality interactive communications across IP infrastructures, to deliver critical control functions to enable high quality interactive communications across IP network borders. A "session" is any real-time, interactive voice, video or multimedia communication using IP session signaling protocols such as SIP, H.323, MGCP or Megaco/H.248. The "border" is any IP-IP network border such as those between service provider and customer/subscriber, or between two service providers. "Control" functions minimally include security and service assurance. Security functions provide access control and topology hiding at layers 3 and 5. Service assurance functions guarantee session capacity and control.

Security and address preservation features include network access control based on stateful packet inspection, with firewall dynamic pinholes created only for authorized media flows, and network topology hiding at both layer 3 and 5 via double network address and port translations. SBCs additionally protect softswitch, gatekeeper, gateway, application server, media server and other service other service infrastructure equipment from Denial of Service (DoS) attacks and overload with rate limiting of both signaling messages and media flows. SBCs simultaneously support SIP, MGCP and H.323 networks by actively participating in session signaling and can be controlled by a third part, multi-protocol softswitch, H.323 gatekeeper or MGCP call agent using a pre-standard MIDCOM protocol. The Performance requirements for some typical SBCs in a carrier class environment typically range in the order of 5 Gig with 100K concurrent sessions.

Strict verification of the correctness of a security implementation through testing, however, is of paramount importance as any defective implementation could result in windows of vulnerability that could be exploited by a malicious intruder to invade the very assets being protected. In the realm of security, a faulty implementation of a security device is doubly dangerous, as unnoticed backdoors that can be used for malicious intent, will contribute to a false sense of security. These windows of vulnerability can in turn be used by a malicious attacker for a Denial of Service attack, in the simplest case, up to a takeover of network assets that can be used to control and disrupt other parts of the network. The penalty associated with this security capability, however, is a considerable degradation in performance. The consequence of this performance degradation can result in two equally unappealing outcomes: (i) excessively long windows of vulnerability; and (ii) a self-inflicted Denial of Service attack as the underperforming device shuts out subsequent calls.

In view of the above discussion there is a need to properly benchmark and verify the performance of various firewall security devices. Methods and apparatus that will permit a quantification of functionality and performance at carrier-class scales would be especially beneficial.

SUMMARY OF THE INVENTION

The present invention is directed to methods and apparatus for testing of Internet-Protocol packet network perimeter protection devices, e.g., Border Gateways such as Session Border Controllers and/or service edge router adjuncts, including dynamic pinhole capable firewalls. Analysis and testing of these network perimeter protection devices is performed to evaluate the ability of such device to perform at carrier class levels. The efficiency of call signaling processing and state table look-up functions, implemented in a particular perimeter protection device, are determined and evaluated. Proper performance and efficiency of such perimeter protection devices are evaluated as a function of a rate of session signaling change (related to call signaling processing), e.g., session establishment rate (assuming no sessions are being dropped), and/or as a function of total pre-existing active sessions (related to state table look-up processing). Various different network perimeter protection devices, e.g., of different types and/or from different manufactures, can be benchmarked for suitability to carrier class environments and comparatively evaluated. For purposes of discussion, calls, e.g., VOIP sessions, swill be used as exemplary sessions. It should be appreciated that various exemplary equations and examples that discuss calls are, equally applicable to the more general case of sessions and session signaling.

Various features of the invention are directed to test equipment devices, e.g., enhanced Integrated Intelligent End Points (IIEPs), for fault testing, evaluating and stressing the network perimeter protection devices in a system environment. In typical but not necessarily all implementations, these specialized test devices are used in pairs, one on each side of a firewall under test. These test equipment devices include a heavy duty traffic generator module, monitoring and analysis elements. In various embodiments, the monitoring and analysis elements include a CPU utilization analysis module, and a graphical output capable module for displaying test results in any one of a plurality of user friendly graphical display formats.

Stateful packet filtering is a very consumptive process of both memory and CPU utilization. The memory utilization is expected to be linear according to the size of the state table. The CPU utilization, on the other hand, is extremely complex and can be approximately modeled as follows:

$$cpu(t) = \text{call-rate}(t) \times (\int \text{call-rate}(t)dt) \times \epsilon$$

where:
call-rate=arriving calls
∫call-rate(t)dt=total calls in process
ϵ=efficiency factor in table look-up.

In accordance with one feature of the invention, an efficiency factor, ϵ, which can be expressed as efficiency function, for a border gateway device including stateful dynamic pinhole filtering through its firewall is determined.

In one, but not all implementations, the efficiency factor is determined using the following equation:

$$\epsilon = cpu(t)/(\text{call-rate}(t) \times (\int \text{call-rate}(t)dt))$$

where:
the number of arriving calls and the total number of total calls in progress are controlled using known test inputs and the cpu utilization is a measured output parameter.

In the above example, the term calls is used but it should be appreciated that the equation is applicable to sessions more generally. In the following portions of the present application the term call or calls should be interpret as a communications session, e.g., a voice or data session, unless the reference is explicitly to a "voice call" or "VOIP call" in which case the reference is to a voice call or voice session and should not be interpreted as covering a non-voice data session.

The cpu(t) usage has a direct impact on the speed of pinhole closing. Determination of closing delay, measured by a parameter called Closing Delay Window of Vulnerability (CDWV), is a significant measure of firewall operation efficiency. Correlation between cpu(t) and the CDWV parameter as a function of time can yield new information on efficiency of table look-up algorithm. This model is based on insights derived from actual testing performed at a local service provider's laboratory.

The model assumes that a state table, e.g., a 5-tuple table, is used to implement some pinhole filters will grow linearly with the number of active calls, hence memory usage grows linearly, but the CPU usage is highly nonlinear. For each 5-tuple entry in the table, several actions that are very CPU intensive are normally performed, including:

Signaling packet inspection throughout the length of the call, in particular, INVITE 20K, and waiting for a BYE (to use a SIP example), Port coordination, Keeping timers for two IP addresses and two ports in each 5-tuple and looking for respective expirations.

Beyond the signaling packet processing which is related to the incoming call rate, the timers use the association of RTP packets with table entries, thus involving table traversal for each arriving media packet. As the table gets too large because of a large number of concurrent sessions which increases the size of the table, available CPU time gets used up fairly quickly. As a result, CPU utilization tends to be a function of the total number of calls in play, e.g., the integral in the above exemplary CPU loading formula, and directly related to the length of the state table, e.g., 5-tuple state table, used to implement the firewall as well as the inherent processing involved in call signaling for high incoming call rates.

It is assumed that while the firewall device's CPU is working under normal operating conditions, e.g., acceptable loading levels, pinholes would close fairly quickly, almost instantaneously, and negligible spread in pinhole (e.g., firewall port) closing timing would be observed. However, as the CPU starts to become time overloaded, BYEs might be missed, timers might not be handled properly and thus the time to closing, i.e., closing delay window of vulnerability (CDWV), would start getting longer and longer. As a function of call load, represented by the number of in-process pre-existing calls and/or the rate of new incoming calls, the CDWV would begin to show some spread, until the cpu could no longer handle any new calls. At this point, no new pinholes can be opened, and therefore an "opening delay" parameter may also be measured. Subsequently the CDWV would start coming back to normal levels, e.g., as the rate on new incoming calls dropped, and the opening delay would again becomes negligible.

The methodology of the invention includes, in various embodiments, the generation and study of curves of CPU vs. call rate (X,Y), CPU vs. total calls (X,Y), CPU vs. (call rate, total calls) (X,Y,Z), CDWV vs call rate (X,Y), CDWV vs. total calls (X,Y), and/or CDWV vs (call rate, total calls) (X,Y,Z) which can be used characterize the system. In some embodiments, pinhole opening delays are also measured and studied as a function of call rate, total calls, and (call rate, total calls) to further characterize the system. If a vendor were to have a very clever algorithm to do the table keeping, this should be observable in the determined efficiency factor, e.g., by a high value in comparison to other vendors. In the regime of convulsive "borderline" behavior is where it is to be expected that the most interesting results will be data-mined. The correlations of these parameters (e.g., CPU utilization, CDWV, opening delays, call rate, total calls, call rate in combination with total calls) allows the discernment of patterns, and thus permits the performance of the firewall device under test to be characterized in a quantitative and useful manner.

In order to obtain quantitative test results from which a firewall efficiency factor can be determined, and the efficiency of different firewall implementations tested and compared, various testing implementations of the present invention involve testing firewalls of border gateway routers under: 1) varying session load conditions, e.g., the number of pre-existing calls (current sessions) which exist at a given time and 2) different rates of session change, e.g., as may be expressed in terms of the rate at which communications sessions are created or dropped (incoming call rate/call drop).

As part of the test procedure, the firewall of a boarder gateway router is subjected to different amounts of constant or relatively constant numbers of ongoing communications sessions. Typical experimental processes performed in accordance with methods of the present invention would measure:

1. cpu(t) as a function of incoming call rates (continuously from 1 call/sec to 1Kcall/sec) while maintaining the number of preexisting calls fixed. This measurement would effectively isolate the contribution of call signaling processing to the cpu utilization.

2. Process 1 repeated for increasing numbers of preexisting calls ranging from 0 to 100K in steps of 1000 preexisting calls. These measurements would add the complexity of state table keeping and the corresponding look-up mechanisms for arriving RTP packets to the cpu utilization.

3. cpu(t) as a function of preexisting concurrent sessions (ranging from 0 to 100K in steps of 1000 calls) for fixed rates of incoming calls
4. Process 3 repeated for increasing rates of incoming calls ranging from 1 call/sec to 1K call/sec. These measurements would add the complexity of state table keeping and the corresponding look-up mechanisms for arriving RTP packets to the cpu utilization required to process new calls namely the call signaling processing component.
5. CDWV (measured in millisec units) as a function of incoming call rates (continuously from 1 call/sec to 1Kcall/sec) while maintaining the number of preexisting calls fixed. This measurement would effectively isolate the contribution of call signaling processing to the cpu utilization.
6. Process 1 repeated for increasing numbers of preexisting calls ranging from 0 to 100K in steps of 1000 preexisting calls. These measurements would add the complexity of state table keeping and the corresponding look-up mechanisms for arriving RTP packets to the cpu utilization.
7. CDWV (measured in millisec units) as a function of preexisting concurrent sessions (ranging from 0 to 100K in steps of 1000 calls) for fixed rates of incoming calls.
8. Process 3 repeated for increasing rates of incoming calls ranging from 1 call/sec to 1K call/sec. These measurements would add the complexity of state table keeping and the corresponding look-up mechanisms for arriving RTP packets to the cpu utilization required to process new calls namely the call signaling processing component.
9. Correlation of data from processes 4 and 8 analyzed graphically and without eliminating the possibility of using other advanced techniques of data classification and analysis collectively known as "data mining".

From this data, a 4 dimensional matrix with the data above can be constructed with following values (call-rate, total existing calls, cpu, CDWV). This matrix will be used to extract the graphical representation described above in any "slice" necessary for data segmentation, for example (call-rate, total existing calls) or (call-rate, total existing calls, CDWV) or (call-rate, total existing calls, cpu) or (CDWD, cpu), etc.

During a period of time in which the number of ongoing communications sessions, e.g., VOIP calls, which are maintained is held constant, a large number of communications sessions, e.g., calls, are initiated. The call initiation signaling can be in parallel for multiple calls, e.g., with multiple call set up signals being sent at the same time. These calls which are in addition to the ongoing calls which are maintained, may be terminated, e.g., in parallel, to stress the firewall. This may involve sending multiple session termination signals at the same time. Session establishment and termination can be implemented at a known measurable rate to provide a desired rate communications session change, e.g., the adding or dropping of 10,000 calls or more in a second. One or more calls are terminated during the period of time where a predetermined level of session signaling is maintained, e.g., by maintaining a fixed number of sessions, adding and terminating an equal number of sessions or by performing some combination of these operation. As the rate of communications session change is varied, processor, e.g., CPU, utilization in the device, e.g., border gateway router implementing the dynamic firewall, is monitored. The CPU utilization information, reflecting different amounts of CPU utilization at different rates of communications session change, provides information on the efficiency of the firewall under a particular constant load, e.g., the fixed number of continuing communications sessions which are maintained while the rate of communications session change is varied. During the test process, the amount of time required to close pinholes from the time a communications session termination message is redetected and/or generated is also monitored thereby providing information on the rate of pinhole closing under different load conditions.

In accordance with the invention, different constant communications session loads are used during different periods of time as part of the processes of testing a wide range of different communications session change rates for a plurality of different constant communications session loads. These constant conditions may be maintained by maintaining a fixed number of ongoing session and/or by creating and terminating sessions at the same rate thereby resulting in a constant firewall loading condition. Thus, the system of the present invention is able to collect a wide range of CPU loading and pinhole closing delay information for a wide range of constant session loads and different rates of session signaling. The precise order in which the loads and/or rates of session signaling are varied is not important in most embodiments and the order or load and rate testing may vary depending on the particular implementation.

The resulting test information is analyzed, processed and efficiency estimates are generated for the various constant communications sessions loads and different rates of communications session change. The different rates of change can be introduced by establishing additional sessions beyond those need to maintain the constant load. The resulting efficiency factors as well as pinhole closing rate information and/or CPU utilization information are determined, processed and displayed in a graphical representation on a display device. Plots of the analysis may, and in some embodiments are, also printed. Multiple firewalls, e.g., with different CPUs and/or hardware configurations can be tested in accordance with the present invention. In some embodiments, the results for multiple firewalls, e.g., plots of analysis, efficacy factors, pinhole closing delays, etc. are plotted and displayed graphically for multiple firewalls on a single display or printout. In this manner characteristics and efficiency of multiple firewalls can be displayed and reviewed in an intuitive and easy to interpret manner.

In various embodiments the testing method described above with regard to a first dynamic firewall, operating in a first border gateway router positioned between a trusted and untrusted network zone, is repeated for various different border gateway routers, e.g., a second, third, fourth, etc. router each of which may include different hardware and/or dynamic firewall implementation software. In this manner CPU utilization and firewall implementation efficiency can be tested and compared in a verifiable manner while, at the same time testing the dynamic firewall to make sure that it provides the error of protection expected in terms of port opening and/or closing delays as communications sessions are initiated and/or terminated. The methods and apparatus of the present invention may be used with implementations that support SIP and/or H.323 signaling.

In accordance with one feature of the present invention, CPU utilization, determined efficiency factors, and/or port opening and/or closing delays measured for several different firewall implementations and/or gateway routers are displayed in a single graphical representation allowing for simple and intuitive comparisons between the efficiency and reliability of various dynamic firewalls.

The methods of the present invention seek, and do, determine efficiency factors and/or functions corresponding to one or more different network border security devices including dynamic pinhole filtering capabilities and allows for the benchmarking of each evaluated device. The method used in various exemplary implementations includes: stressing the firewall device under test at various load levels and conditions up to and/or exceeding typical carrier class network loads, measuring parameters indicative of functional operation and performance, obtaining graphical results, and using data mining analytical techniques.

An exemplary method of the invention focused on SIP additionally involves various preliminary steps that should be considered in order to have clean data to perform the above analysis. First, a preliminary analysis will be performed, prior to testing. An exemplary analysis may include the following:

Create a set of call flows that may cause incorrect operation of the SUT, including at least some of the following set, but not limited to the following set.
  i. incomplete SIP transactions
  ii. partial closing of sessions (offer/answer)
  iii. specialized SIP call modification requests such as UPDATE
  iv. interactions with RTCP
  v. interactions with S/MIME and TLS within call signaling
  vi. failures of user agents (crashes, etc.) in mid-call
  vii. removal of Route headers by end systems to bypass SUT
  viii. interactions with NAT and NAPT Having modeled the SUT including the perimeter protection devices including dynamic stateful pinhole filtering capabilities, and having devised a set of call flows to be implemented as part of the test procedure, testing apparatus, e.g., enhanced Integrated Intelligent End Points (IIEPs), implemented in accordance with the present invention are coupled to the SUT on both sides of the perimeter protection device or devices to be tested. Call flows are generated, in accordance with the devised set of test calls/flows and the response is monitored, observed, and recorded.

The results are evaluated to check for one or more of the following problems or conditions:
  (i) Excessive delay in opening "pinholes" resulting in "unintentional" Denial of Service.
  (ii) Determination of incorrectly allocated "pinholes", resulting in Denial of Service.
  (iii) Determination of opening of extraneous "pinholes"/IP address combinations through the firewall, increasing the systems vulnerability through unrecognized backdoors.
  (iv) Determination of incorrect operation that includes permanently-open pinholes as well as pinholes that fail to be opened, thus causing call failure.
  (v) Determination of inability to correlate call-state information with established rules in the firewall.

Another stage of the test method, used in some embodiments, involves the specific measurement of the delay to pinhole opening and delay to closing under different call loads with the goal of using the Integrated Test Analysis (ITA) Tool as a performance analyzer for SUTs with statefull firewall capabilities under carrier class rates. The testing includes one or more of the following, in accordance with the methods of the present invention.
  (i) The enhanced IIEPs have been supplemented, with respect to lower traffic rate IIEPs, to include a heavy duty traffic generator to stress a firewall with increasing loads, e.g., up to 100000 concurrent stateful sessions, in order to study the behavior of firewall and obtain an efficiency factor or efficiency function corresponding to the perimeter protection device including the firewall.
  (ii) An analytical module, as part of the ITA, will record the CDWV timings and present the curves CDVW vs. load in graphical form for analysis. Stress points will be determined from curves as overload behavior.
  (iii) Benchmarks on cpu(t) will be determined on firewall CPU performance based on load parameters and conclusions drawn on appropriate stateful firewall design model.

Another exemplary method of the invention, which is focused on H.323 protocol instead of SIP, will now be described briefly. An exemplary method of the invention focused on H.323 additionally involves various preliminary steps that should be considered in order to have clean data to perform the above analysis. Many of the steps associated with the H.323 protocol security testing method are similar to those used for testing the security of devices implementing SIP in the manner discussed above. In the method used for testing devices implementing H.323 first, a preliminary analysis is performed, prior to testing. An exemplary analysis may include one or more of the following:

Create a set of call flows that may cause incorrect operation of the SUT, including at least some of the following set, but not limited to the following set:
  i. incomplete H.323 transactions;
  ii. partial closing of sessions (offer/answer);
  iii. interactions with RTCP;
  iv. interactions with H.235 and TLS within call signaling;
  v. failures or crashes in mid-call;
  vi. removal of headers by end systems to bypass SUT; and
  vii. interactions with NAT and NAPT.

Having modeled the SUT including the perimeter protection devices including dynamic stateful pinhole filtering capabilities, and having devised a set of call flows to be implemented, testing apparatus, e.g., enhanced Integrated Intelligent End Points (IIEPs), implemented in accordance with the present invention are coupled to the SUT on both sides of the perimeter protection device or devices to be tested. Call flows are generated, in accordance with the devised set of test calls and the H.323 standard and the response is monitored, observed, and recorded.

The results are evaluated to check for any one or more of the following problems or conditions:
  (i) Excessive delay in opening "pinholes", resulting in "unintentional" Denial of Service;
  (ii) Determination of incorrectly allocated "pinholes", resulting in Denial of Service;
  (iii) Determination of opening of extraneous "pinholes" IP address combinations through the firewall, increasing the systems vulnerability through unrecognized backdoors;
  (iv) Determination of incorrect operation that includes permanently-open pinholes as well as pinholes that fail to be opened, thus causing call failure; and
  (v) Determination of inability to correlate call-state information with dynamically established rules in the firewall.

Another stage of the test method involves the specific measurement of the delay to pinhole opening and delay to closing under different call loads with the goal of using the Integrated Test Analysis (ITA) Tool as a performance analyzer for SUTs with stateful firewall capabilities under carrier class rates. The testing includes one or more of the following, in accordance with the methods of the present invention.

(i) The IIEPS will be supplemented with a heavy duty traffic generator to stress firewall with increasing loads, e.g., up to 32000 concurrent stateful sessions, to study behavior of firewall;

(ii) the analytical module will record the CDWV timing and present the curves CDVW vs. load in graphical form for analysis. Stress points will be determined from curves as overload behavior; and (iii) benchmarks on CPU(t) will be determined on firewall CPU performance from load parameters and conclusions drawn on appropriate stateful firewall design model.

The testing of the above described methods may be repeated using different perimeter protection devices, e.g., from different vendors. Comparative benchmark functionality and performance information may be used by a service provider in the selection of the supplier and type, e.g., model, of the perimeter protection device to purchase and incorporate in their IP network. In addition, results and conclusions, data mined from the testing and analysis including observed faults and efficiency factors or efficiency functions may be forwarded to a vendor in a partnership arrangement with the service provider. The vendor, knowing the precise algorithm implemented for the state-table access functions, can use such information to fine tune their algorithm to increase efficiency of CPU utilization.

The present invention, in various H.323 testing embodiments, also includes specialized testing and analysis equipment, implemented in accordance with the present. For example multiple enhanced Integrated Intelligent End Points (IIEPs), strategically placed, in a SUT, may be part of an Integrated Test Analysis (ITA) tool or testing/evaluation system. Apparatus of the present invention may include heavy duty traffic generation tools, call generation modules, monitoring modules, graphical analysis modules, and analysis modules which using data mining techniques to determine efficiency factors or functions for perimeter protection devices using stateful dynamic pinhole filtering for a firewall of an IP packet network.

Numerous additional features, benefits and details of the various methods and apparatus of the present invention are discussed in the detailed description which follows.

BRIEF DESCRIPTION OF THE FIGURES

FIG. 3B is a flowchart of an exemplary method of testing and evaluating the vulnerability and performance of network perimeter protection devices; the method is directed toward M.323 or a similar protocol.

DETAILED DESCRIPTION

Figure 1:
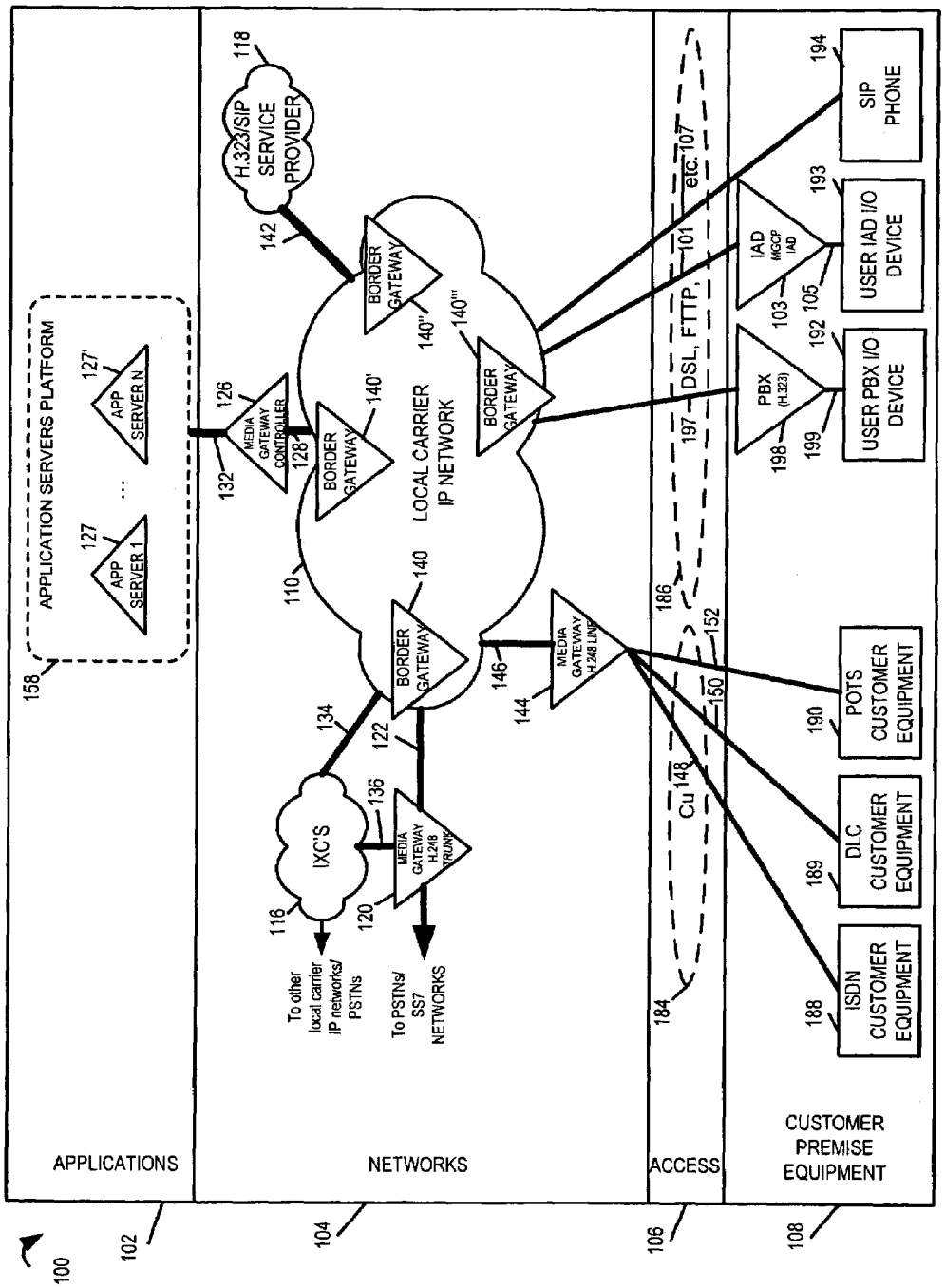
FIG. 1 is a drawing illustrating an exemplary softswitch structure and topology in a communications system including network edge security devices including firewalls which may be tested in accordance with the methods and apparatus of the present invention.

FIG. 1 is a drawing illustrating exemplary Softswitch infrastructure and topology in an exemplary communications system 100. Exemplary system 100 includes applications infrastructure 102, networks infrastructure 104, access infrastructure 106, and customer premise facilities infrastructure 108.

The networks infrastructure 104 includes a local carrier Internet Protocol (IP) Network 110, IntereXchange Carrier (IXC) networks 116, an H.323 and/or SIP Service Provider Networks 118, Master Gateway Controller 126, Media Gateway 120, and Media Gateway 144.

Local Carrier IP network 110 is an IP network providing connectivity and functionality for the delivery of advanced voice and data services over IP by the local service provider. The local carrier IP network 110 includes a plurality of border gateways (140, 140' 140", 140''') serving as perimeter protection devices for local carrier IP network 110.

Media Gateway 120, e.g., a Packet Voice Gateway (PVG) such as a H.248 trunk gateway, is situated between local carrier IP network 110 and Public Switched Telephone Networks (PSTNs)/SS7 networks. Trunk 122 couples the local carrier IP network 110 to Media Gateway 120. In some embodiments, the PSTN/SS7 network coupled to Media Gateway 120 is owned and/or operated by the same Service Provider as local carrier IP network 110. A Media Gateway Controller (MGC) 126, e.g., a VoIP Call Manager, is coupled to the local carrier IP network 110 via link 128; the MGC 126 is also coupled to an Applications Server Platform 158 via link 132.

IXCs 116, e.g., long distance carriers, are coupled to local carrier IP network 110 via trunk 134 and to Media Gateway 120 via trunk 136. The IXCs 116 may be coupled to other local carrier IP networks and/or other PSTNs providing connectivity between local carrier IP network 110 to other local networks, of the same or a different service provider.

A plurality of border gateways (140, 140', 140", 140'''), operating on the edge or perimeter of network 110, provide firewall protection between the interior of local carrier IP network 110 and various external networks, service providers, media gateways, application servers, and/or customer premises. Each border gateway (140, 140', 140", 140'''), e.g., a Session Border Controller (SBC), includes a firewall including stateful capable dynamic pinhole filtering. Border Gateway 140 couples Media Gateway 120, Media Gateway 144, and IXCs 116 through its firewall to the interior of IP network 110. Border Gateway 140' couples Master Gateway Controller 126 through its firewall to the interior of IP network 110. Border Gateway 140" couple H.323/SIP service provider network 118 through its firewall to the interior of IP network 110. Border Gateway 140''' couples various customer premise equipment 191, 198, 103, 194 through its firewall to the interior of IP network 110. In general the number and types of Border Gateways used in local carrier IP network 110 may vary depending upon loading considerations, interconnectivity requirements, and the size of the network 110. In addition, a single given border gateway need not be, and in many cases is not, restricted to interfacing to a single type or class of external network or device. For example, in some embodiments, the same border gateway which interfaces to a H.323/SIP service provider network may also interface to customer premise equipment.

The H.323/SIP service provider network 118 performs Value Added Data Security Services (VADSS) for provisioned customers. Some of these value added services may include VoIP services and advanced features such as dynamic pinhole filtering for the customer premises protection. Border Gateway (140, 140', 140", 140'"), a more secure alternative to a NAT device, includes a stateful capability of "dynamic pinhole filtering". The VADSS can provision available capabilities to customers from the local carrier IP network 110 edge, e.g., providing a more secure linkage to value-added services and billing for access to those services. In some embodiments, some value added services are included as part of the border gateway (140, 140', 140", 140'"), allowing the local carrier to receive revenue for those local network sourced value added services. The stateful modes of operation employed in border gateway (140, 140', 140", 140'") are extremely consumptive of CPU cycles for performing its functions. The present invention provides testing apparatus and methods for verifying the performance of border gateway (140, 140', 140", 140'") in terms of its performance at the rates demanded by a carrier class network, e.g., Gigabit Ethernet (GigE) interfaces with typical concurrent sessions of the order of up to 100K or higher.

For example, in Voice over Internet Protocol (VoIP) ports used to carry the media part of the call, are dynamically assigned through signaling, taken down upon call termination, and reused for a subsequent call at a later time. This technology is denominated "dynamic pinhole filtering", as firewalls need to filter traffic dynamically by opening/closing ports (pinholes) depending on the state or progress of a call. The correct implementation of this technology, e.g., in border gateway 140, provides a good level of protection at a level of granularity not otherwise achievable with other current security technologies. The evaluation of the implementation and level of protection provided by the dynamic pinhole filtering at high traffic rates is provided by the methods and apparatus of the present invention.

Networks 104 also include a Media Gateway 144, e.g., a H.248 Line Gateway, coupled to local carrier IP network 110 via trunk 146. Media Gateway 144 is also coupled to a plurality of twisted pair Cu lines (148, 150, 152).

Application infrastructure 102 includes an application servers' platform 158. Application Servers' Platform 158 includes a plurality of application servers (Application Server 1 127, Application Server N 127'). Exemplary application servers (127, 127') are, e.g., Ubiquity, MCS, CS2k applications. In some embodiments, local carrier integration applications may communicate with the application servers platform applications 158 via SIP signaling 178, thus providing an interface to a SS7 signaling network.

Customers, e.g., residential and/or business customers, obtain access to networks 104 via the access infrastructure 106. Access infrastructure 106 includes Copper (Cu) lines, e.g., twisted pair Cu lines and coupling devices, indicated by dotted line grouping 184 and/or by higher capacity lines, e.g., Digital Subscriber Lines (DSL) and/or Fiber To The Premise (FTTP) optical cables, coupling devices, and or other transmission devices such as repeaters, indicated by dotted line grouping 186.

Customer Premise Facilities 108, includes a plurality of different types of equipment such as, e.g., Integrated Services Digital Network (ISDN) customer equipment 188, Digital Loop Carrier (DLC) customer equipment 189, Plain Old Telephone Service (POTS) customer equipment 190, PBX network User I/O devices 192, Integrated Access Devices (IAD) 193, e.g., devices which supports voice, data, and video streams over a single high capacity circuit, and a SIP phone 194. The ISDN customer equipment 188, e.g., a video conferencing system including an ISDN interface is coupled to media gateway 144 via Cu line 148. DLC customer equipment 189 is coupled to media gateway 144 via Cu line 150. POTS customer equipment 190, e.g., a pulse type phone, a dual tone multi-frequency (DTMF) type phone, a fax machine, is coupled to media gateway 144 via POTS Cu line 152. DSL or fiber link 197, e.g., a trunk, couples the local carrier IP network 110 to a customer Private Branch Exchange (PBX) 198, e.g., a Meridian (H.323/MDCN) PBX which is located at the customer premise facility 108. User PBX I/O devices 192 are coupled to PBX 198 via local network link 199. DSL or fiber link 101, e.g., a trunk, couples the local carrier IP network 110 to a Integrated Access Device Gateway 101, e.g., a Master Gateway Control Protocol (MGCP) IAD gateway, which is located at the customer premise facility 108. User IAD I/O device 103 is coupled to IAD gateway 101 via local network link 105. SIP phone 194 is coupled to local carrier IP network 110 via DSL or fiber link 107.

Figure 2A:
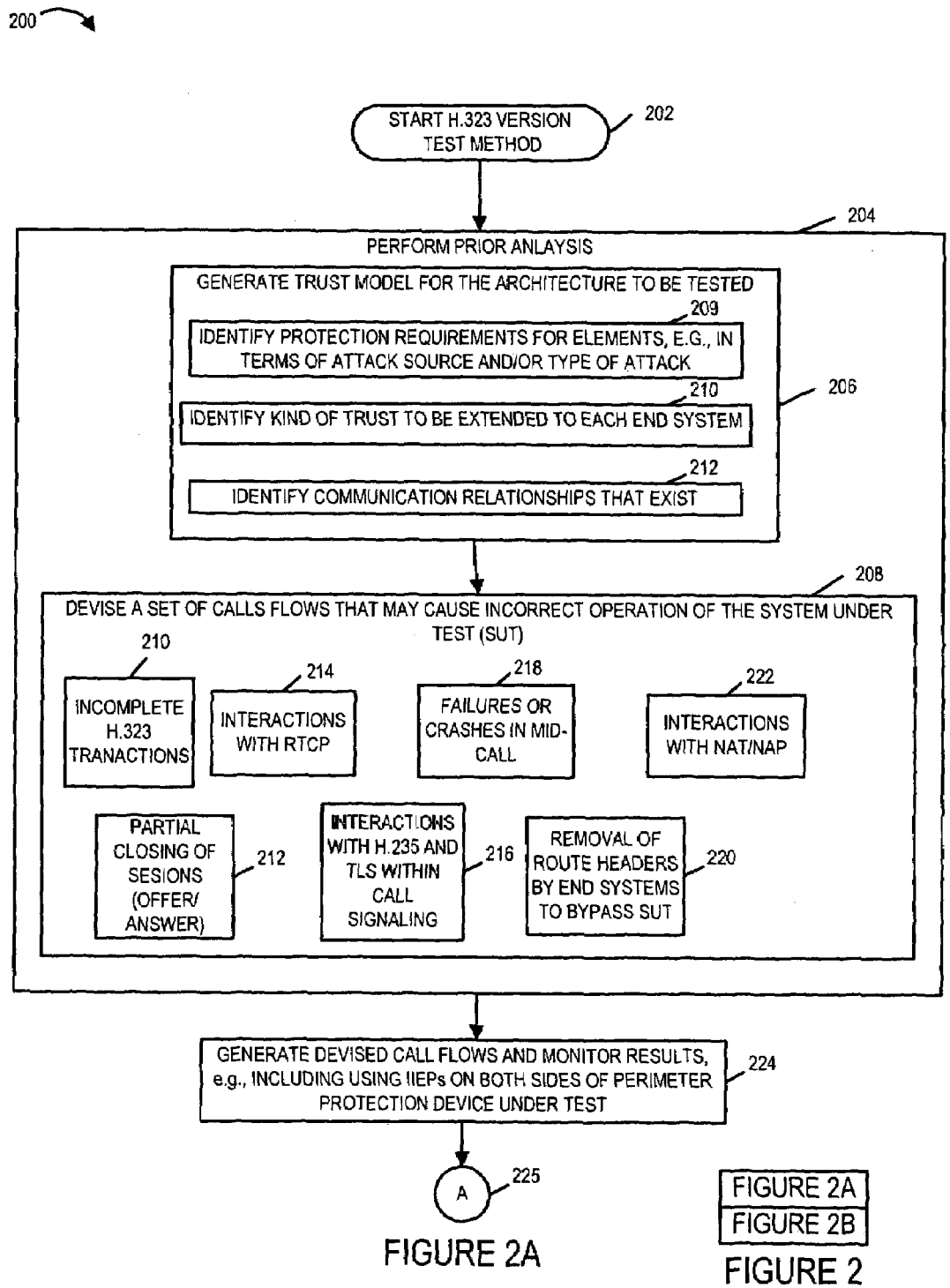
FIG. 2 comprising the combination of FIG. 2A
FIG. 2B is a flowchart of an exemplary method of testing and evaluating the vulnerability and performance of network perimeter protection devices; the method is directed toward SIP or a similar protocol.
Figure 2B:
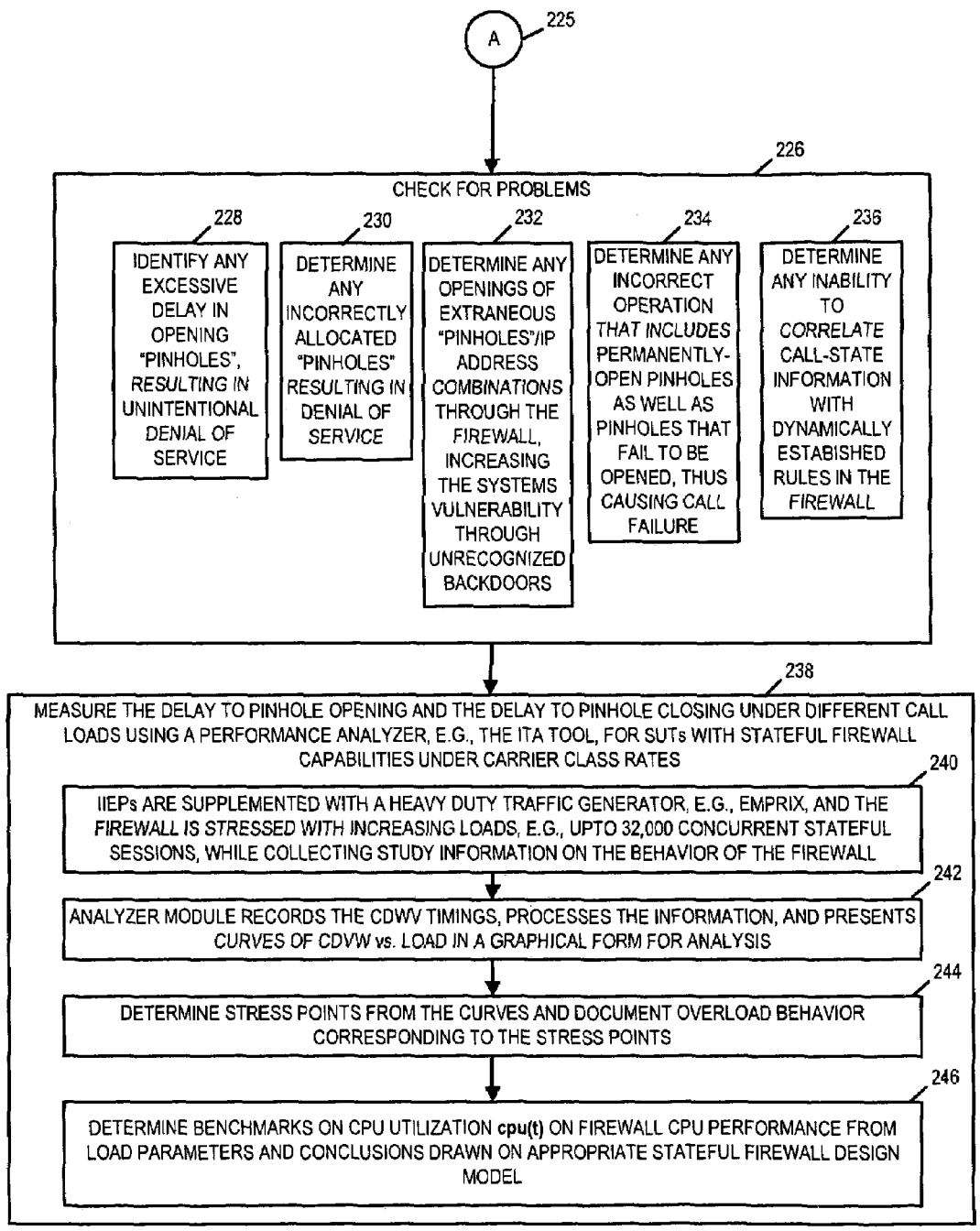

FIG. 2 comprising the combination of FIG. 2A and FIG. 2B is a flowchart 200 of an exemplary method of testing and evaluating the vulnerability and performance of network perimeter protection devices. These network perimeter protection devices protect crucial network assets such as Softswitch infrastructure components, e.g., media gateways, signaling gateways, and application servers, by blocking potentially nefarious unwanted traffic from ever reaching those crucial assets. These network perimeter protection devices, e.g., border gateway 140, implement firewall capabilities in both a stateless and stateful modes, the stateful modes being extremely consumptive of CPU cycles. The border gateway 140 uses "dynamic pinhole filtering" as its firewalls filter traffic dynamically by opening and closing ports, sometimes referred to as pinholes, depending on the state and progress of a call. The exemplary method of flowchart 200 is directed toward testing an evaluating a network perimeter protection device or devices interfacing with an external service provider network utilizing H.323 or a similar protocol.

The method starts in step 202 where system information, e.g., topology, element, signaling messages employed is gathered. Operation proceeds from step 202 to step 204. In step 204, a prior analysis of the system is performed. Step 204 includes sub-step 206 of generating a trust model for the architecture to be tested and sub-step 208 of devising a set of call flows that may cause incorrect operation of the system under test (SUT).

Sub-step 206 further includes lower level sub-steps 209, 210 and 212. In sub-step 208, protection requirements for elements, e.g., in terms of attack source and/or type of attack are identified. In sub-step 210, the kind and/or level of trust to be extended to each end system is identified. In sub-step 212, the communication relationships that exists are identified.

In sub-step 208, as previously stated, a set of call flows that may cause incorrect operation of the SUT are devised. Exemplary call flows include: incomplete H.323 transactions 210, partial closing of sessions, e.g., offer/answer 212, interactions with RTCP 214, interactions with H.235 and TLS within call signaling 216, failures or crashes in mid-call 218, removal of route headers by end systems to bypass SUT 220, and interactions with NAT/NAP 222.

Operation proceeds from step 204 to step 224, where the devised call flows of step 208 are generated, input to the SUT and the results are monitored. Step 224 involves the coupling to the SUT of specialized pinhole testing apparatus, implemented in accordance with the present invention, and the use of such apparatus. The specialized pinhole testing apparatus includes enhanced Integrated Intelligent End-Points (IIEPs) placed outside the firewall in the untrusted network and inside the firewall in the trusted network being guarded by the network perimeter protection device, e.g., border gateway.

Operation proceeds from step 224 via connecting node A 225 to step 226. In step 226, checks are performed to identify any observed or determined problems. Various operations that may be performed in the checking process of step 226 include: (i) identifying an excessive delay in opening "pinholes" resulting in an unintentional denial or service 228, e.g., the interruption or prevention of one from making calls (ii) determine any incorrectly allocated "pinholes" resulting in denial of service 230, (iii) determine any openings of extraneous "pinholes"/IP address combinations through the firewall, increasing the systems vulnerability through unrecognized backdoors 232, (iv) determine any incorrect operation that includes permanently-open pinholes as well as pinholes that fail to be opened, thus causing a call failure 234, and (v) determine any inability to correlate call-state information with dynamically established rules in the firewall 236.

Operation proceeds from step 236 to step 238. In step 238, the test system is operated to measure the delay to pinhole opening and the delay to pinhole closing under different call loads using a performance analyzer, e.g., the Integrated Testing Analyzer (ITA) tool, for SUTs with stateful firewall capabilities under carrier class rates of operation. Step 238 includes sub-steps 240, 242, 244, and 246. In sub-step 240, IIEPs are supplemented with a heavy duty traffic generator, e.g., EMPRIX, and the firewall is stressed with increasing loads, e.g., up to 32,000 concurrent stateful sessions, while collecting study information on the behavior of the firewall. In step 242, the analyzer module records the CDWV timings, processes the information, and presents curves of CDVW vs. Load in a graphical form for analysis. Then in step 244, stress points are determined from the curves and the specifics of the overload behavior are documented corresponding to the stress points. In step 246, benchmarks on CPU utilization, cpu(t), are determined on firewall CPU performance from the load parameters and conclusions drawn on the appropriate corresponding stateful firewall design model.

Figures 3, 3A:
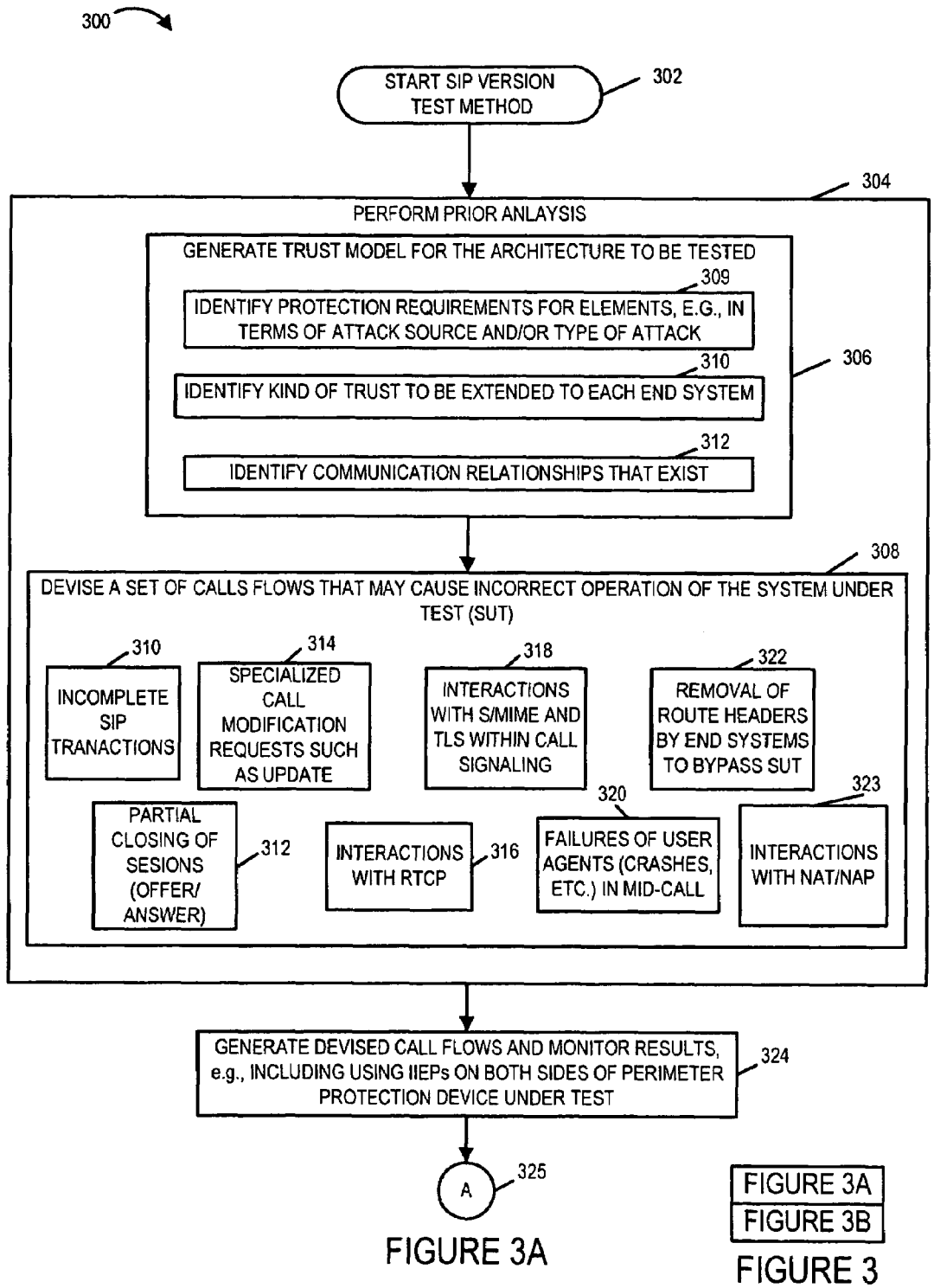
FIG. 3 comprising the combination of FIG. 3A

FIG. 3 comprising the combination of FIG. 3A and FIG. 3B is a flowchart 300 of an exemplary method of testing and evaluating the vulnerability and performance of network perimeter protection devices. The exemplary method of flowchart 300 is directed toward testing an evaluating a network perimeter protection device or devices interfacing with an external service provider network utilizing SIP or a similar protocol.

The method starts in step 302 where system information, e.g., topology, element, signaling messages employed is gathered. Operation proceeds from step 302 to step 304. In step 304, a prior analysis of the system is performed. Step 304 includes sub-step 306 of generating a trust model for the architecture to be tested and sub-step 308 of devising a set of call flows that may cause incorrect operation of the system under test (SUT).

Sub-step 306 further includes lower level sub-steps 309, 310 and 312. In sub-step 309, protection requirements for elements, e.g., in terms of attack source and/or type of attack are identified. In sub-step 310, the kind and/or level of trust to be extended to each end system is identified. In sub-step 312, the communication relationships that exist are identified.

In sub-step 308, as previously stated, a set of call flows that may cause incorrect operation of the SUT are devised. Exemplary call flows include: incomplete SIP transactions 310, partial closing of sessions, e.g., offer/answer 312, specialized call modification requests such as update 314, interactions with RTCP 316, interactions with S/MIME and TLS within call signaling 318, failures of user agents, e.g., crashes, in mid-call 320, removal of route headers by end systems to bypass SUT 322, and interactions with NAT/NAP 323.

Operation proceeds from step 304 to step 324, where the devised call flows of step 308 are generated, input to the SUT and the results are monitored. Step 324 involves the coupling to the SUT of specialized pinhole testing apparatus, implemented in accordance with the present invention, and the use of such apparatus. The specialized pinhole testing apparatus includes Integrated Intelligent End-Points (IIEPs) placed outside the firewall in the untrusted network and inside the firewall in the trusted network being guarded by the network perimeter protection device, e.g., border gateway.

Operation proceeds from step 324 via connecting node A 325 to step 326. In step 326, checks are performed to identify any observed or determined problems. Various operations that may be performed in the checking process of step 326 include: (i) identifying an excessive delay in opening "pinholes" resulting in an unintentional denial or service 328, e.g., the interruption or prevention of one from making calls (ii) determine any incorrectly allocated "pinholes" resulting in denial of service 330, (iii) determine any openings of extraneous "pinholes"/IP address combinations through the firewall, increasing the systems vulnerability through unrecognized backdoors 332, (iv) determine any incorrect operation that includes permanently-open pinholes as well as pinholes that fail to be opened, thus causing a call failure 334, and (v) determine any inability to correlate call-state information with dynamically established rules in the firewall 336.

Operation proceeds from step 326 to step 338. In step 338, the test system is operated to measure the delay to pinhole opening and the delay to pinhole closing under different call loads using a performance analyzer, e.g., the Integrated Testing Analyzer (ITA) tool, for SUTs with stateful firewall capabilities under carrier class rates of operation. Step 338 includes sub-steps 340, 342, 344, and 346. In sub-step 340, IIEPs are supplemented with a heavy duty traffic generator, and the firewall is stressed with increasing loads, e.g., up to 100,000 concurrent stateful sessions, while collecting study information on the behavior of the firewall. In step 342, the analyzer module records the CDWV timings, processes the information, and presents curves of CDVW vs. Load in a graphical form for analysis. Then in step 344, stress points are determined from the curves and the specifics of the overload behavior are documented corresponding to the stress points. In step 346, benchmarks on CPU utilization, cpu(t), are determined on firewall CPU performance from the load parameters and conclusions drawn on the appropriate corresponding stateful firewall design model.

Figure 4:
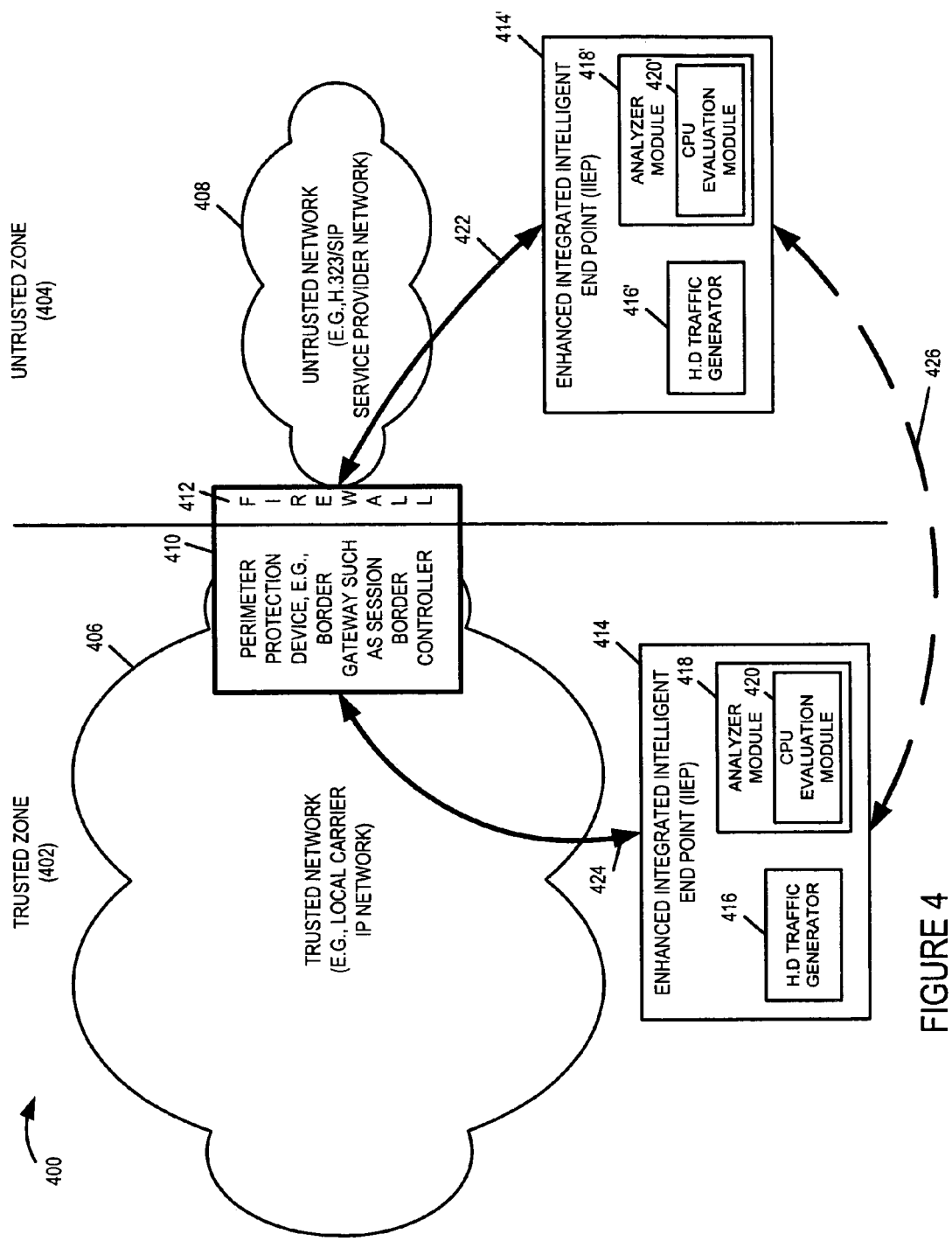
FIG. 4 is a drawing of an exemplary system under test including test apparatus implemented in accordance with the present invention.

FIG. 4 is a drawing 400 of an exemplary system under test in accordance with the present invention. The exemplary system includes a trusted zone 402 and an untrusted zone 404. The trusted zone 402 includes a trusted network 406, e.g., a local carrier IP network. The untrusted zone 404 includes an untrusted network, e.g., a H.323 and/or SIP service provider network 408. The trusted network 406 is guarded on its network edges by perimeter protection devices 410, e.g., a border gateway such as a session border controller device. The perimeter protection device 410 includes a firewall 412 serving to guard the trusted network 410 and its crucial Softswitch infrastructure components. Perimeter protection device 410 includes stateless and stateful modes of operation. Perimeter protection device 410 opens and closes ports, sometimes referred to as pinholes, within its firewall 412. Perimeter protection device 410 uses a set of rules to control the opening and closing of these pinholes; those rules may, and often do, include the maintenance and use of state information. Perimeter protection device 410 may have been specified by its manufacturer to operate within a set of performance values under a set of specified loading conditions, e.g., a number of concurrent stateful sessions.

Test Apparatus are included on each side of the firewall 412 to stress and evaluate the firewall 412 and the performance of the perimeter protection device 410. An exemplary test apparatus, in accordance with the present invention, is an enhanced integrated intelligent end point (IIEP) 414 including a heavy duty traffic generator 416, and an analyzer module 418. The analyzer module 418, in accordance with the present invention, includes a CPU evaluation module 420. Heavy duty traffic generator module 418 allows the enhanced IIEP to generate traffic with increasing loads, e.g., to produce up to 32,000 concurrent stateful sessions, to stress firewall 412. Analyzer module 418 allows the enhanced IIEP to monitor, record and evaluate the operation of the perimeter protection device, e.g., detecting faults, detecting denials of service, detecting vulnerabilities, violations of firewall rules, and CPU utilization. CPU evaluation module 420 evaluates perimeter protection device 410 as loading conditions increase resulting in increased CPU utilization cpu (t). The CPU evaluation module 420 compares observed CPU firewall performance to benchmarks to evaluate the stateful firewall design model.

Enhanced IIEP 414' in untrusted zone 404 is the same or similar to enhanced IIEP 414 in trusted zone 402. Although each enhanced IIEP 414, 414' is implemented, the same or similarly, different modules or functions within the enhanced IIEP may be used depending upon where the IIEP is situated, e.g., with respect to firewall 412. For example, H.D traffic generator 416' in enhanced IIEP 414' may be the primary source of the high traffic flows, while analyzer module 418 in enhanced IIEP 414 may be the primary recipient of monitored information used for CPU evaluation under load. Solid arrow 422 represents signaling flows between enhanced IIEP 414' through untrusted network 408 to the exterior side firewall 412; while solid arrow 424 represents signaling flows between enhanced IIEP 414 through trusted network 402 to the interior side of firewall 412. Dashed arrow 426 shows an optional connection between enhanced IIEP 414 and enhanced IIEP 414' provided for testing purposes to coordinate operations and share information between the enhanced IIEPs 414, 414'.

Figure 5:
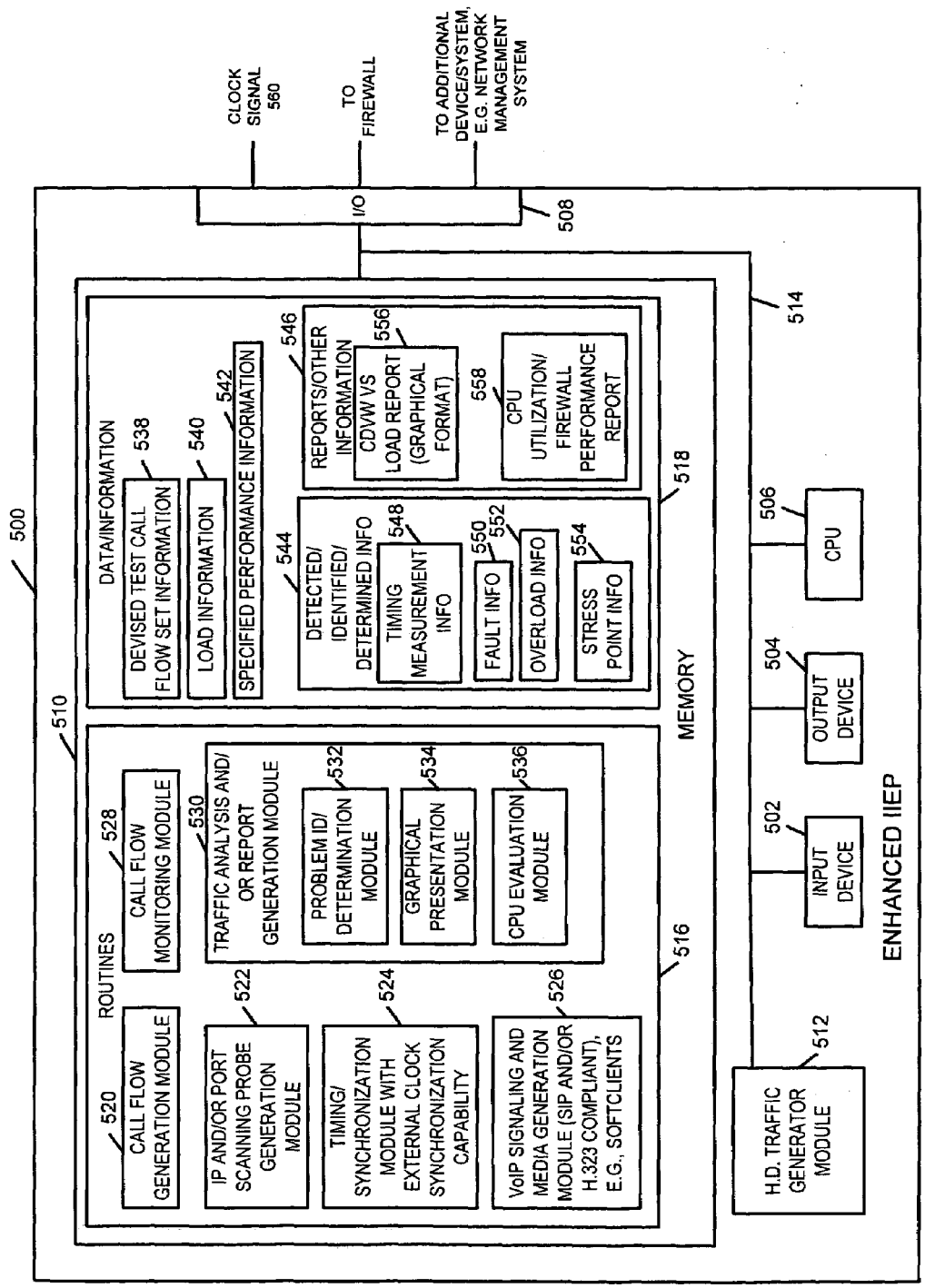
FIG. 5 illustrates an exemplary testing apparatus, an enhanced Intelligent Integrated End Point (IIEP), implemented in accordance with the present invention and using methods of the present invention.

FIG. 5 illustrates an exemplary enhanced IIEP 500 which may be used as the enhanced IIEP 414 or 414' shown in FIG. 4. The IIEP 500 includes an input/output (I/O) device 508 which operates as an interface to the firewall 412 and to additional devices and/or systems, e.g., a network management system and/or external clock signal 560. The IIEP 500 also includes an input device 502, output device 504, processor, e.g., CPU, 506, a memory 510, a heavy duty traffic generator module 512 which are coupled together and to the I/O device 508 via a bus 514.

Input device 502 may be implemented as a keyboard through which a system administrator can enter commands and/or other data. Output device 504 may be implemented as, e.g., a display and/or printer, and can be used to display and/or print generated reports and information relating ongoing tests, monitoring and/or firewall test results. CPU 506 controls operation of the enhanced IIEP 500 including the generation of test signals and reports under control of one or more of the modules stored in memory 510 which are executed by CPU 506.

Memory 510 includes routines 516 and data/information 518. Various modules included in routines 516 include a call flow generation module 520, an IP address and/or Port scanning probe generation module 522, timing/synchronization module 524, a VoIP signaling and media generation module 526, a call flow monitoring module 528, and a traffic analysis and/or report generation module 530. Call flow generation module 520 is used to generate call flows which have been devised, based on the model of the system architecture which are intended to potentially cause incorrect operation of the system under test, and pre-loaded into the memory 510. IP and/or port scanning probe generation module 522 is used to generate test signals in accordance with the invention. Timing/synchronization module 524 is used to synchronize the operation of the enhanced IIEP 500 with another enhanced IIEP device, e.g., by synchronizing the enhanced IIEP operation to an external clock signal source 560, which is also used by at least one other enhanced IIEP device. VoIP signaling and media generation module 526 is used to generate SIP and/or H.323 compliant call setup and termination signals as required by the testing process of the present invention. Call flow monitoring module 528 is used to collect information, e.g., pertaining to the firewall, as the testing proceeds. Traffic analysis and/or report generation module 530 is used to analyze detected signals including signals passing through the firewall, signals rejected by the firewall, signals indicating faults, and signals indicating overload, and generate reports on firewall operation there from.

Traffic analysis and/or report generation module 530 includes a problem identification (ID)/determination module 532, a graphical presentation module 534, and a CPU evaluation module 536. Problem ID/determination module 532 (i) identifies excessive delays in pinhole opening resulting in unintentional denial of service, (ii) determines any incorrectly allocated pinholes resulting in denial of service, (iii) determines any openings of extraneous pinholes/IP address combinations through the firewall, increasing the system's vulnerability to unrecognized back doors, (iv) determines any incorrect operations that include permanently open pinholes as well as pinholes that fail to be opened, causing call failure, and/or (v) determine the inability to correlate call state information with dynamically established rules in the firewall. Graphical presentation module 534 processes information and presents curves to the user in graphical format, e.g., curves of CDVW vs load. CPU evaluation module 536 determines stress points from the collected information and documents the overload behavior corresponding to the stress points. The CPU evaluation module 536 also evaluates firewall CPU performance as a function of the loading conditions, compares the performance measured to benchmark levels and specifications of the firewall design, and generates reports identifying conclusions.

Heavy duty traffic generator module 512 is operated under the direction of the CPU 506 and functions in coordination with routines 510. H.D. traffic generator module 512 is used to stress the firewall at different load level, e.g., up to 100,000 concurrent stateful sessions, so that the firewall's behavior and performance may be studied and evaluated as a function of load. High load levels are a particularly significant factor when evaluating CPU performance of a perimeter protection device.

Data/information 518 includes devised test call flow set information 538, load information 540, specified performance information 542, detected/identified/determined information 544, and reports/other information 546. Devised test call flow information set information 538 may include, e.g., incomplete H.323 transactions, incomplete SIP transactions, partial closing of sessions, specialized call modification request such as updates, interactions with H.235 and TLS within call signaling interactions with RTCP, interactions with S/MINE and TLS with call signaling, failures of user agents such as crashes in mid-call, removal of route headers by end systems to bypass SUT, and/or interactions with NAT/NAP. Devised test call flow set information 538 may be preloaded, prior to the initiation of testing, by a system administrator or operator, via input interface 502. Load information 540 includes information, e.g., a loading test profile, on the different loading conditions of the firewall to be implemented at different times as part of the test sequence. Load information 540 is used as input by the H.D. traffic generator module 512. Specified performance information 542 includes firewall design characteristics and/or requirements that are being evaluated and against which measured performance is compared. Specified performance information 542 may include, e.g., overload condition specifications, pinhole opening and closing delay characteristics, and specified CPU performance as a function of load. Detected/identified/determined information 544 includes information obtained from the call flow monitoring module 528 and information obtained from the traffic analysis and/or report generation module 530. Detected/identified/determined information 544 includes timing measurement information 548, fault information 550, overload information 552 and stress point information 554. Timing measurement information 548 may include measured pinhole opening and closing information. Fault information 550 may include information such as identified denials of service, determined extraneous pinhole openings, determined permanently open pinholes, determines pinholes that fail to open, and/or determined faults in correlation of call state information with firewall rules. Overload information 552 includes information documenting the firewall behavior upon reaching an overload condition as well as the input conditions, e.g., loading and/or type of signaling, that resulted in the overload. Stress point information 554 includes information documenting the firewall behavior at a stressed condition as well as the input conditions, e.g., loading and/or type of signaling, that resulted in the stressed condition.

Reports/other information 546 includes CDVW vs load reports 556, e.g., presented in a graphical format and CPU utilization/firewall performance report 558. The CPU utilization/firewall performance report 558 includes information identifying detected problem areas, marginal areas, and information comparing detected, measured, and/or determined information to the specified performance information for the firewall device, which includes benchmarking the firewall device as a function of load.

Figure 6:
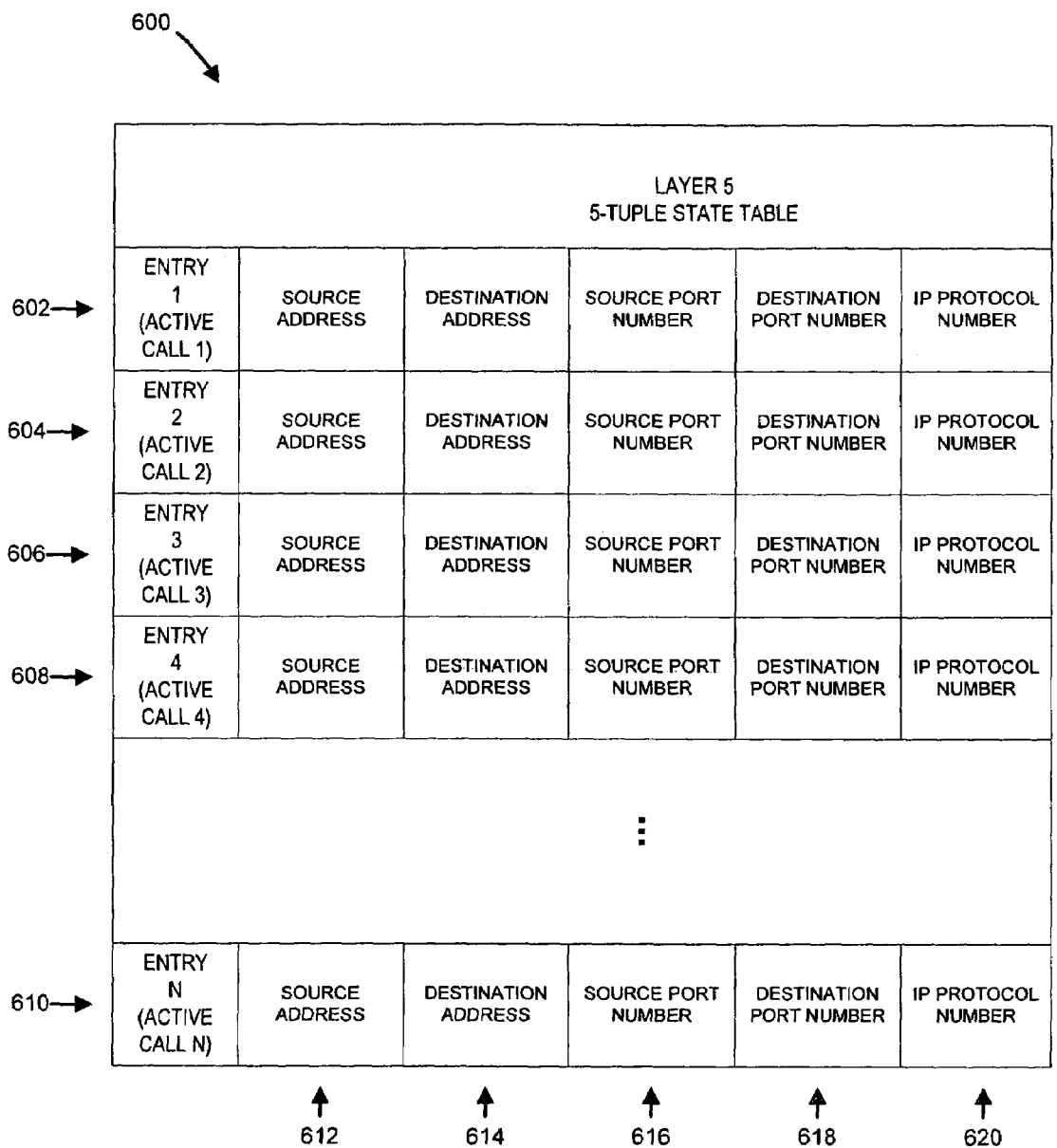
FIG. 6 is a drawing of an exemplary n-tuple state table, which may included as part of a network edge security device including a firewall to store session information, the methods and apparatus of the present invention evaluating the efficiency of the network edge security device's algorithm to retrieve and use stored information in the table under various conditions.

FIG. 6 is a drawing of an exemplary n-tuple state table 600, which may included as part of a network edge security device including a firewall to store session information. Methods and apparatus of the present invention evaluate the efficiency of a network edge security device's algorithm to retrieve and use stored information in its state table under various conditions, e.g., various traffic load levels. Exemplary state table 600 is an exemplary layer 5 IP 5-tuple state table that may be included as part of an exemplary perimeter protection device, e.g., device 410 of FIG. 4. Each row of table 600 corresponds to a set of state information for an active call. First row 602 corresponds to the state entries for active call 1; second row 604 corresponds to the state entries for active call 2; third row 606 corresponds to the state entries for active call 3; fourth row 608 corresponds to the state entries for active call 4; Nth. row 610 corresponds to the state entries for active call N. First column 612 corresponds to a source address 1; second column 614 corresponds to a destination address 2; third column 616 corresponds to the source port number; fourth column 618 corresponds to the destination port number; fifth column 620 corresponds to an IP Protocol number.

Exemplary state table size and memory used to store the table grows linearly as a function of the number of active calls. For each 5 tuple entry in table 600, several actions that are very CPU intensive need to be performed: (i) signaling packet inspection throughout the length of a cell, e.g., waiting for a BYE in SIP signaling; (ii) port coordination; (iii) keeping timers for two ports in each 5-tuple and looking for respective expirations.

In addition to the signal packet processing, the timers require the association of RTP packets with table entries, requiring table traversal for every arriving media packet.

In accordance with on feature of the invention, an efficiency factor, $\epsilon$, which can be expressed as efficiency function, for a border gateway device including stateful dynamic pinhole filtering through its firewall is determined.

In one, but not all implementations, the efficiency factor is determined using the following equation:

$$\epsilon = cpu(t)/(\text{call-rate}(t) \times (\int \text{call-rate}(t) dt))$$

where:

the number of arriving calls and the total number of total calls in progress are controlled using known test inputs and the cpu utilization is a measured output parameter.

The cpu(t) usage has a direct impact on the speed of pinhole closing. Determination of closing delay, measured by a parameter called Closing Delay Window of Vulnerability (CDWV), is a significant measure of firewall operation efficiency.

In order to obtain quantitative test results from which a firewall efficiency factor can be determined, and the efficiency of different firewall implementations tested and compared, various testing implementations of the present invention involve testing firewalls of border gateway routers under varying session load conditions and for different rates of session change as may be expressed in the parallel termination of multiple communications sessions which are ongoing through a firewall being tested.

As part of the test procedure, the firewall of a boarder gateway router is subjected to different amounts of constant or relatively constant numbers of ongoing communications sessions. During a period of time in which the number of ongoing communications sessions, e.g., VOIP calls, which are maintained is held constant, a large number of communications sessions, e.g., calls, are initiated. These calls which are in addition to the ongoing calls which are maintained, are terminated in parallel to stress the firewall. Thus, while the calls may be initiated in parallel or at different times, the calls are normally terminated in parallel to implement a known measurable rate of communications session change, e.g., the dropping of 10,000 calls or more in a second. Different numbers of calls are terminated in parallel during the period of time where a predetermined number of calls are maintained. As each of the different numbers of calls, corresponding to different rates of communications session change are terminated, CPU utilization in the device, e.g., border gateway router implementing the dynamic firewall is monitored. The CPU utilization information, reflecting different amounts of CPU utilization at different rates of communications session change, provides information on the efficiency of the firewall under a particular constant load, e.g., the fixed number of continuing communications sessions which are maintained while the rate of communications session change is varied. During the test process, the amount of time required to close pinholes from the time a communications session termination message is sent is also monitored thereby providing information on the rate of pinhole closing under different load conditions.

In accordance with the invention, different constant communications session loads are used during different periods of time as part of the processes of testing a wide range of different communications session change rates for a plurality of different constant communications session loads.

The resulting test information is analyzed, processed and efficiency estimates are generated for the various constant communications sessions loads and different rates of communications session change. The resulting efficiency factors as well as pinhole closing rate information and/or CPU utilization information is processed and displayed in a graphical representation on a display device. Plots of the analysis may, and in some embodiments are, also printed.

The testing method described above with regard to a first dynamic firewall, operating in a first border gateway router positioned between a trusted and untrusted network zone, is repeated for various different border gateway routers, e.g., a second, third, fourth, etc. router each of which may include different hardware and/or dynamic firewall implementation software. In this manner CPU utilization and firewall implementation efficiency can be tested and compared in a verifiable manner while, at the same time testing the dynamic firewall to make sure that it provides the error of protection expected in terms of port opening and/or closing delays as communications sessions are initiated and/or terminated. The methods and apparatus of the present invention may be used with implementations that support SIP and/or H.323 signaling.

In accordance with one feature of the present invention, CPU utilization, determined efficiency factors, and/or port opening and/or closing delays measured for several different firewall implementations and/or gateway routers are displayed in a single graphical representation allowing for simple and intuitive comparisons between the efficiency and reliability of various dynamic firewalls.

Figures 7, 7A:
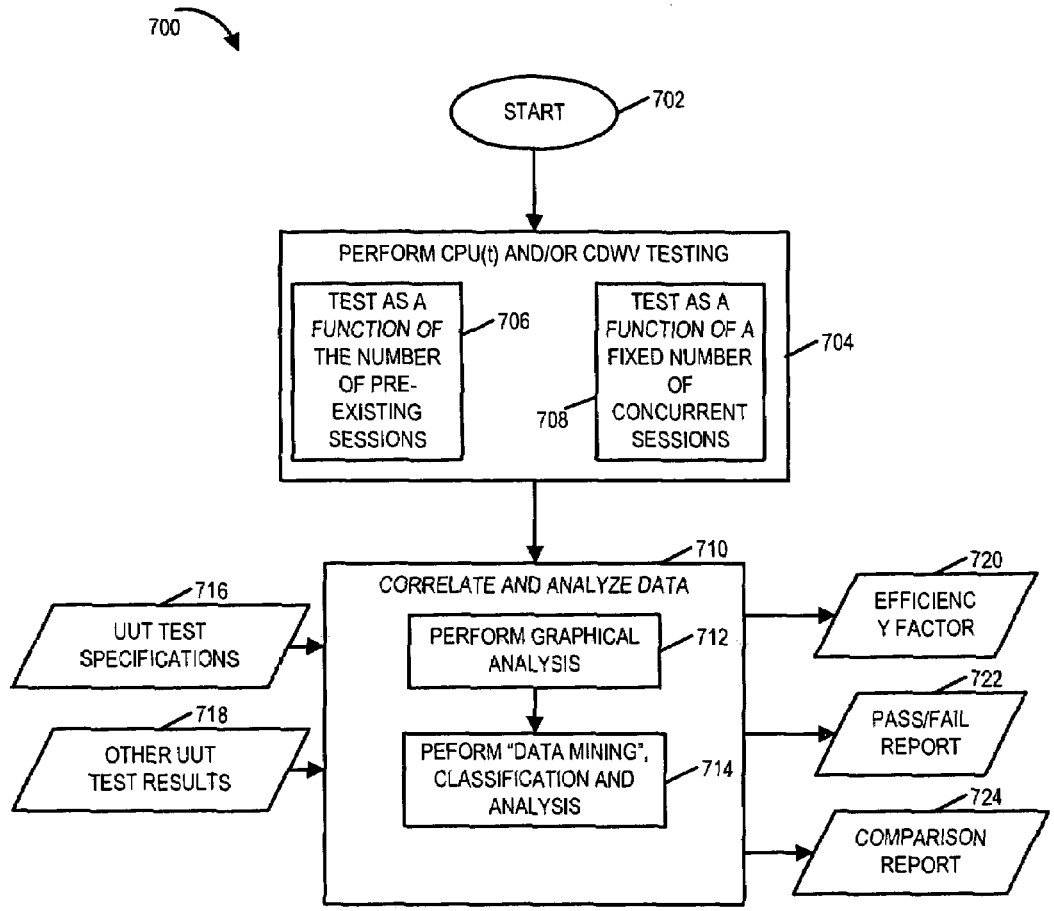
FIG. 7 comprising the combination of FIGS. 7A, 7B, and 7C is a flowchart 700 of an exemplary method in accordance with the present invention of testing and evaluating dynamic pinhole capable firewall devices.
Figure 7B:
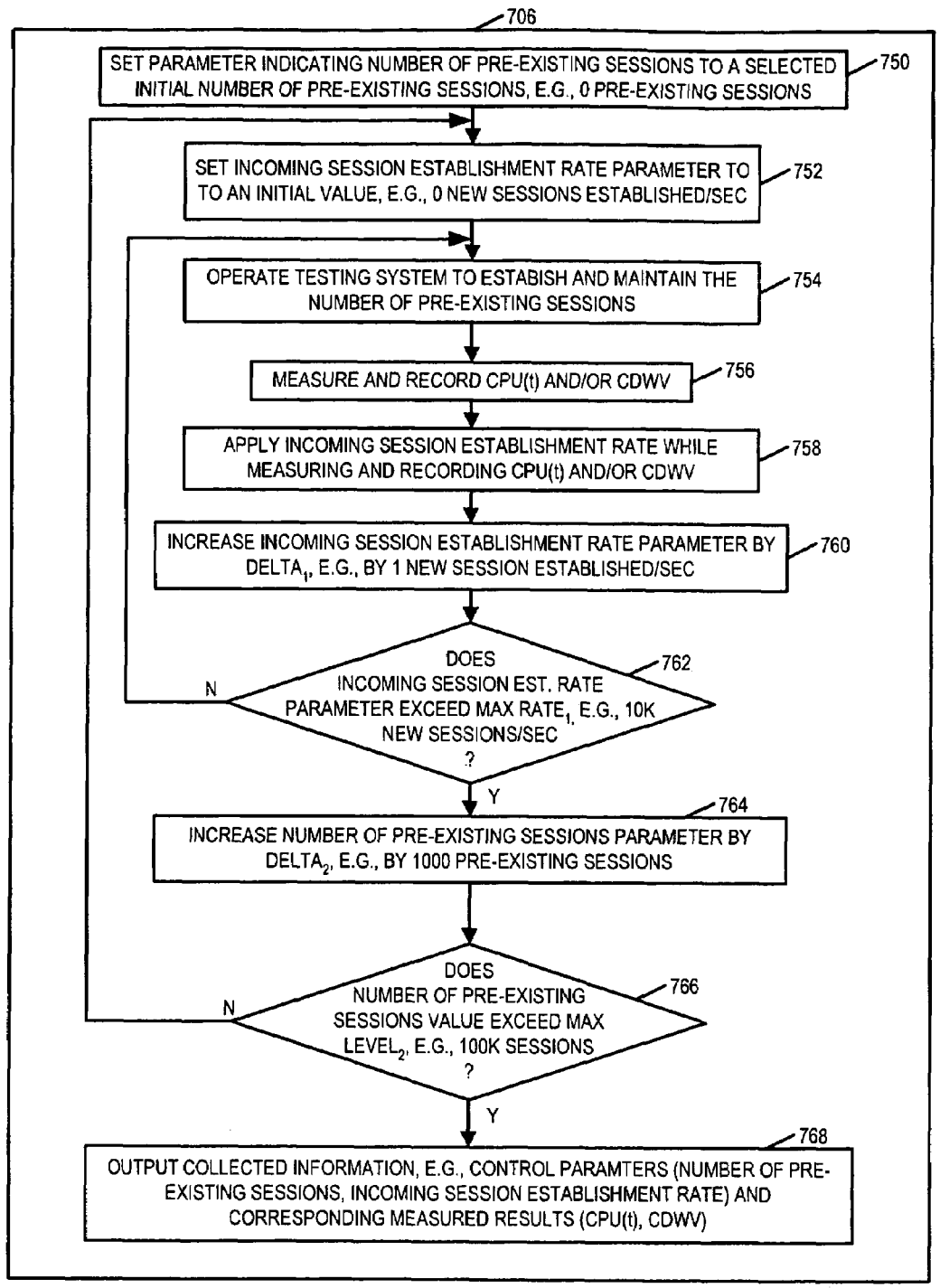
Figure 7C:
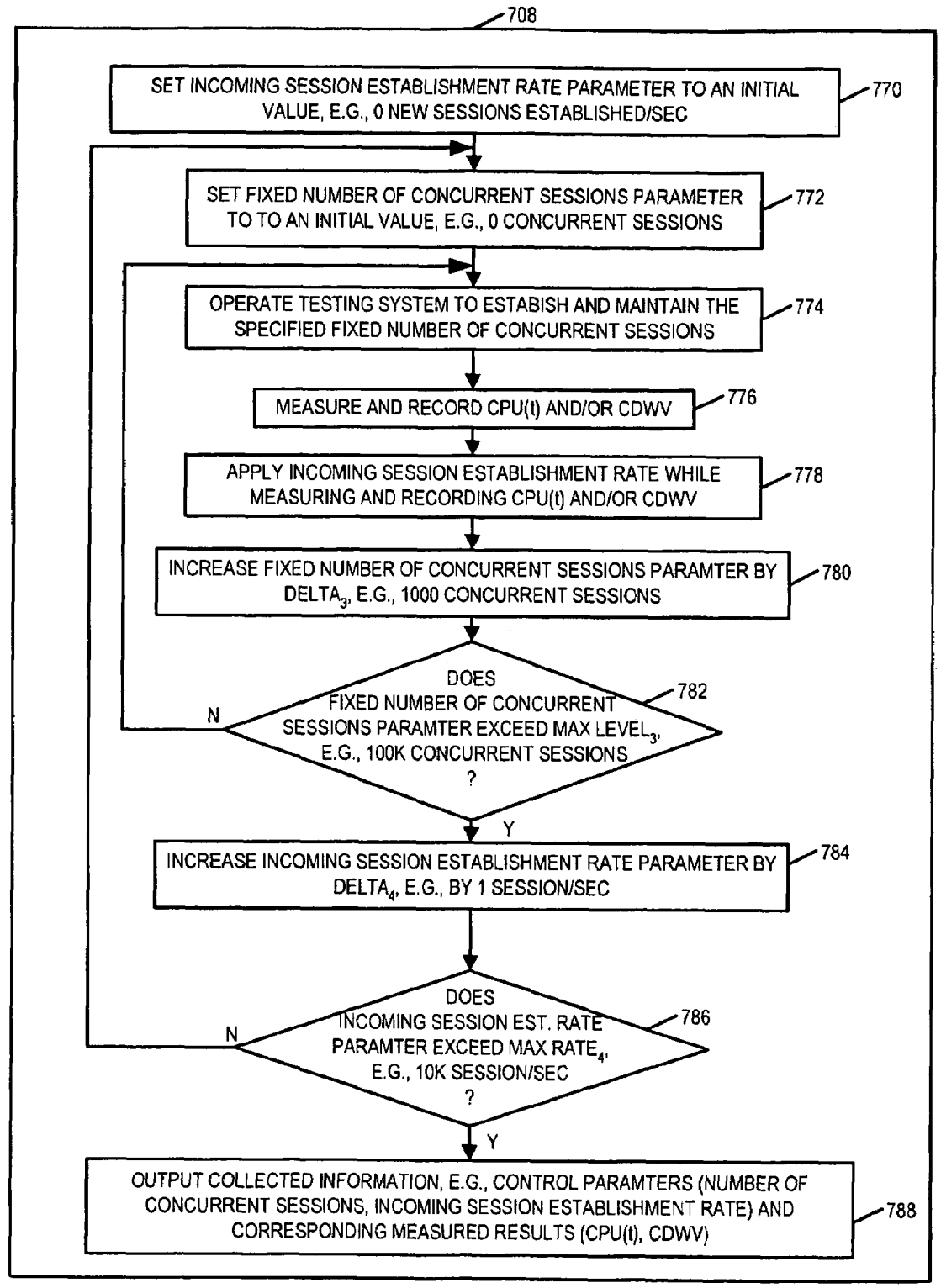

FIG. 7 comprising the combination of FIGS. 7A, 7B, and 7C is a flowchart 700 of an exemplary method in accordance with the present invention of testing and evaluating dynamic pinhole capable firewall devices to evaluate performance and product suitability to carrier class environments. The method begins in start step 702, where the unit under test (UUT), a perimeter protection device, e.g., a Border Gateway such as a Session Border Controller with dynamic pinhole capability, is coupled to the testing apparatus, e.g., two Enhanced Integrated Intelligent End Points (IIEPs) including a heavy duty traffic generator module and an analyzer module, with one IIEP on each side of the firewall. Operation proceeds from step 702 to step 704.

In step 704, the testing system is operated to perform CPU utilization (CPU(t)) and/or closing delay window of vulnerability (CDWV) testing in accordance with the present invention. Step 704 includes sub-steps 706 and 708, which may be performed at different times.

In sub-step 706, the testing system is operated to test as a function of the number of pre-existing sessions, obtaining CPU(t) measurements and/or CDWV measurements for different combinations of pre-existing sessions and new session establishment rates. In step 706, in some embodiments, for a given test point the pre-existing sessions are not being terminated, with the exception of a termination or terminations used to collect CDWV values.

In sub-step 708, the testing system is operated to test as a function of a fixed number of concurrent sessions, obtaining CPU(t) measurements and/or CDWV measurements for different combinations of the number of concurrent sessions and the incoming sessions establishment rate. The number of concurrent sessions can be a combination of a number of pre-existing sessions which continue and a net gain/loss due to the number of incoming sessions being established minus the number of sessions being terminated. Testing of step 708 with different controlled breakdowns of the number of concurrent sessions is possible, in accordance with the present invention, with different proportions between the number of pre-existing sessions which continue and the number due to incoming sessions minus terminating sessions.

An exemplary implementation of sub-step 706 is included in FIG. 7B. The exemplary method of sub-step 706 starts in step 750, where the test system is operated to set a parameter indicating the number of pre-existing sessions to a selected initial number of pre-existing sessions, e.g., 0 pre-existing sessions. Operation proceeds from step 750 to step 752. In step 752, the test system is operated to set an incoming session establishment rate parameter to an initial value, e.g., 0 new sessions established per second. Operation proceeds from step 752 to step 754.

In step 754, the test system is operated to establish and maintain the number of pre-exiting sessions as indicated by the pre-existing session indicator parameter. Operation proceeds from step 754 to step 756. In step 756, the test system is operated to measure and record CPU(t) and/or CDWV. Then, in step 758, the test system is operated to apply the incoming session establishment rate indicated by the incoming session rate establishment rate parameter while measuring and recording CPU(t) and/or CDWV. Then, in step 760, the test system is operated to increase the incoming session establishment rate parameter by a value $DELTA_1$, e.g., 1 new sessions per second. Operation proceeds from step 760 to step 762.

In step 762, the test system is operated to check if the incoming session rate establishment parameter exceeds a value $MAXRATE_1$, e.g., 1K new sessions per second. If $MAXRATE_1$ is not exceeded, operation returns to step 754, and the testing system proceeds to perform another set of measurements at the same pre-existing session rate, but using a new session establishment rate (steps 754, 756, 758).

If $MAXRATE_1$ is exceeded, operation proceeds from step 762 to step 764, where the testing system is operated to update the pre-existing session parameter by increasing the pre-existing session parameter by a value $DELTA_2$, e.g., a value of 1000 pre-existing sessions. Operation proceeds from step 764 to step 766.

In step 766, the test system checks as to whether the value of the pre-existing session parameter exceeds a value $MAXLEVEL_2$, e.g., 100K sessions. If the pre-existing session value parameter does not exceed $MAXLEVEL_2$, then operation returns to step 752, to continue with additional measurements conducted with a new number of pre-existing sessions functioning as an input parameter obtained in step 764.

However, if in step 766, the pre-existing session parameter is determined to have exceeded $MAXLEVEL_2$, then operation proceeds from step 766 to step 768. In step 768, a module or modules within the testing system are operated to output, e.g., forward, collected information, e.g., control parameters (number of pre-existing sessions, incoming session establishment rate) and corresponding measured results (CPU(t), CDWV), to an analyzer module within the testing system.

An exemplary implementation of sub-step 708 is included in FIG. 7C. The exemplary method of sub-step 708 starts in step 770, where the test system is operated to set a parameter indicating the incoming session establishment rate to an initial value, e.g., 0 new sessions established per second. Operation proceeds from step 770 to step 772. In step 772, the test system is operated to set a parameter indicating a fixed number of concurrent sessions to an initial value, e.g., 0 concurrent sessions. Operation proceeds from step 772 to step 774.

In step 774, the test system is operated to establish and maintain the specified fixed number of concurrent sessions as indicated by the fixed number of concurrent sessions parameter. Operation proceeds from step 774 to step 776. In step 776, the test system is operated to measure and record CPU(t) and/or CDWV. Then, in step 778, the test system is operated to apply the incoming session establishment rate indicated by the incoming session rate establishment parameter while measuring and recording CPU(t) and/or CDWV. Then, in step 780, the test system is operated to increase the fixed number of concurrent sessions parameter by a value $DELTA_3$, e.g., 1000 concurrent sessions. Operation proceeds from step 780 to step 782.

In step 782, the test system is operated to check if the fixed number of concurrent sessions parameter exceeds a value $MAXLEVEL_3$, e.g., 100K concurrent sessions. If $MAXLEVEL_3$ is not exceeded, operation returns to step 784, and the testing system proceeds to perform another set of measurements at a different number of concurrent sessions, but using the same incoming session establishment rate (steps 784, 786, 788).

If $MAXLEVEL_3$ is exceeded, operation proceeds from step 782 to step 784, where the testing system is operated to update the incoming session establishment rate parameter by increasing the incoming session establishment rate parameter by a value $DELTA_4$, e.g., 1 session per second. Operation proceeds from step 784 to step 786.

In step 786, the test system checks as to whether the value of the incoming session establishment rate parameter exceeds a value $MAXRATE_4$, e.g., 1K sessions per second. If the incoming session establishment rate parameter does not exceed $MAXRATE_4$, then operation returns to step 772, to continue with additional measurements conducted with a new incoming session establishment rate, as obtained in step 784.

However, if in step 786, the incoming session establishment rate parameter is determined to have exceeded $MAXRATE_4$, then operation proceeds from step 786 to step 788. In step 788, a module or modules within the testing system are operated to output, e.g., forward, collected information, e.g., control parameters (fixed number of concurrent sessions, incoming session establishment rate) and corresponding measured results (CPU(t), CDWV), to an analyzer module within the testing system.

Operation proceeds from step 704 to step 710. In step 710, the testing system is operated to correlate and analyze the data from step 704. Step 710 includes sub-step 712 and sub-step 714. In sub-step 712, the testing system is operated to perform graphical analysis, e.g., obtaining 2 and 3 dimensional plots for review. In sub-step 714, the testing system is operated to perform "data mining" operations, classification, and analysis. In step 710, in addition to the controlled inputs and measured outputs from step 704, the testing system receives and uses inputs 716 and 718. Input 716 is UUT test manufacturer specifications and/or requirements, e.g., CPU time loading performance specifications, closing window delay timing specification, maximum call loading specifications, maximum session initiation and/or session termination specifications, etc. Input 718 is other UUT test results, e.g., corresponding to results obtained on competitors perimeter protection devices and/or different models and/or versions of the same manufacturer.

Various outputs are obtained from step 710 including an efficiency factor or efficiency factor information 720 corresponding to the UUT presently under test, a pass/fail report 722 identifying as to whether the UUT under test satisfied the advertised manufacturer specifications and/or system requirements, and a comparison report 724, e.g., comparing the UUT presently under test to other UUTs under consideration, e.g., by a service provider.

While described in the context of a local carrier IP network system, the methods and apparatus of the present invention, are applicable to a wide range of communications systems.

In various embodiments elements described herein are implemented using one or more modules to perform the steps corresponding to one or more methods of the present invention, for example the enhanced integrated intelligent end points of the invention may include modules for controlling the device to generate traffic for various tests, monitor CPU utilization of a gateway router implementing a dynamic firewall, generate graphic representations of test results corresponding to one or more routers/firewalls, etc. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware which may be part of a test device, to perform one or more of the steps of the above-described method(s).

Numerous additional variations on the methods and apparatus of the present invention described above will be apparent to those skilled in the art in view of the above description of the invention. Such variations are to be considered within the scope of the invention.

What is claimed is:

1. A firewall test method for testing a firewall implemented in a gateway device including a processor, the gateway device being positioned between a trusted network zone and an untrusted network zone, the method comprising:
    coupling said gateway device to a first test device, the first test device including at least a first communications session traffic generator, said first communications session traffic generator including means for generating, maintaining, and terminating communications sessions according to a predetermined test plan;
    operating the first test device to maintain a constant session signaling load through said firewall;
    operating the first test device to apply a plurality of different rates of session signaling change to said firewall while said constant session signaling load is maintained;
    monitoring at least one of a CPU utilization rate and a pinhole closing delay in said firewall for each of the plurality of different rates of communications session change to determine at least one of the rate of CPU utilization for each of said plurality of different rates of communication session change and the pinhole closing delay for each of said plurality of different rates of communication session change; and outputting dynamic firewall loading information obtained from said monitoring.

2. The method of claim 1, wherein operating the first test device to maintain a first constant session signaling load through said firewall includes:

operating the first test device to maintain a first fixed number of ongoing communications sessions through said firewall.

3. The method of claim 2, wherein operating the first test device to apply a plurality of different rates of session signaling change to said firewall includes varying at least one of the rate at which additional sessions are established and the rate at which additional sessions are terminated during the period of time in which said first test device maintains a first constant session signaling load, said additional sessions being in addition to said sessions which are maintained to maintain the constant load.

4. The method of claim 1, wherein operating the first test device to maintain a first constant session signaling load through said firewall includes:

operating the first test device to establish and terminate a plurality of sessions at the same rate.

5. The method of claim 4, wherein operating the first test device to apply a plurality of different rates of session signaling change to said firewall includes varying at least one of the rate at which additional sessions are established and the rate at which additional sessions are terminated during the period of time in which said first test device maintains a first constant session signaling load, said additional sessions being in addition to said sessions which are established and terminated to maintain a constant load.

6. The method of claim 2, wherein said dynamic firewall loading information includes CPU utilization information and wherein said first fixed number of ongoing communications sessions are a first fixed number of VOIP calls.

7. The method of claim 1, further comprising:

determining a firewall operating efficiency factor for a plurality of different rates of communications session change based on CPU utilization information determined from said monitoring which occurred when said first firewall was loaded at said constant session signaling loading.

8. The method of claim 7, further comprising:

operating the first intelligent endpoint test device to change said constant session signaling load to a new constant session signaling load; and repeating said step of operating the first test device to apply a plurality of different rates of session signaling and said monitoring step.

9. The method of claim 8, further comprising:

determining a firewall operating efficiency factor for firewall loading for a plurality of different rates of communications session change from the CPU utilization information obtained from repeating said monitoring step.

10. The method of claim 9, further comprising:

displaying a graphical representation of determined firewall efficiency factors for at least two firewall signal loading rates and said plurality of different communication session rates of change.

11. The method of claim 1, wherein monitoring at least one of a CPU utilization rate and a pinhole closing delay includes:

operating a second test device located in said trusted network zone to monitor the rate at which an open port in said firewall is closed following signaling sent by said first test device to cause the termination of a communications session.

12. The method of claim 1, wherein said firewall test method is also for testing a second firewall employed in a second border gateway device, the method further comprising:

operating the first test device to maintain a third constant session signaling load through said second dynamic firewall;

operating the first test device to apply a plurality of different rates of session signaling change to said second firewall while said third constant session signaling load is maintained;

monitoring at least one of a CPU utilization rate and a pinhole closing delay in said second firewall for each of the plurality of different rates of communications session change to determine at least one of the rate of CPU utilization for each of said plurality of different rates of communication session change and the pinhole closing delay for each of said plurality of different rates of communication session change; and outputting dynamic firewall loading information obtained from said monitoring.

13. The method of claim 12, further comprising:

determining a firewall operating efficiency factor for a plurality of different rates of communications session change based on CPU utilization information determined from said monitoring which occurred when said second firewall was loaded at said third constant session loading rate.

14. The method of claim 13, further comprising:

graphically displaying the determined loading efficiency factors for the first and second firewalls on a single display screen thereby permitting a visual comparison of the efficiency factors of both the first and second firewalls over a range of rates of session communication change.

15. A firewall test system for testing a first dynamic firewall employed in a first border gateway router located between a trusted network zone and an untrusted network zone, the firewall test system comprising:

a first integrated intelligent endpoint test device including at least a first communications session traffic generator positioned in the untrusted network zone, said first communications session traffic generator including means for generating, maintaining, and terminating communications sessions according to a predetermined test plan and means for communicating with another integrated intelligent endpoint test device;

said first intelligent endpoint test device including control means for controlling the first intelligent endpoint test device to different levels of communications session signaling directed through said first dynamic firewall in accordance with a predetermined test plan, at least some of said different rates of session signaling corresponding to different rates of communications session change;

means for monitoring processor utilization in said gateway router for a plurality of different rates of communications session change to determine the rate of processor utilization for a plurality of different rates of communication session change; and report generation means for generating a dynamic firewall loading information report including information obtained from monitoring of processor utilization in said first dynamic firewall.

16. The system of claim 15, further comprising:

control means for controlling the first intelligent endpoint test device to maintain a first fixed number of ongoing communications sessions through said first dynamic firewall during the period of time in which said first intelligent endpoint test device is operated to initiate different rates of session signaling change.

17. The system of claim 16, further comprising:

means for determining a firewall operating efficiency factor for each of a plurality of said plurality of different rates of communications session change based on CPU utilization information determined from said monitoring which occurred when said first dynamic firewall was loaded at said first constant session loading rate.

18. The system of claim 17, further comprising:

means for controlling the first intelligent endpoint test device to maintain a second fixed number of ongoing communications sessions through said firewall during a second period of time; and means for monitoring CPU utilization in said gateway router during said second time period to determine the rate of CPU utilization for each of a plurality of different rates of communications change.

19. The system of claim 18, further comprising:

means for determining a firewall operating efficiency factor for firewall loading for each of the plurality of said plurality of different rates of communications session change from the CPU utilization information obtained from the monitoring during said second time period; and means for displaying firewall operating efficiency factors determined from information obtained during said first and second periods of time.

20. A firewall test method for testing a firewall implemented in a gateway device including a processor, the gateway device being positioned between a trusted network zone and an untrusted network zone, the method comprising:

coupling said gateway device to a first test device, the first test device including at least a first communications session traffic generator, said first communications session traffic generator including means for generating, maintaining, and terminating communications sessions according to a predetermined test plan;

operating the first test device to vary a session signaling load through said firewall;

operating the first test device to apply a plurality of different rates of session signaling change to said firewall while said constant session signaling load is varied;

monitoring at least one of a CPU utilization rate and a pinhole closing delay in said firewall for each of the plurality of different rates of communications session change and different session signaling loads to determine at least one of the rate of CPU utilization for a plurality of different rates of communication session change or session signaling loads; and outputting dynamic firewall loading information obtained from said monitoring.

21. The method of claim 20, wherein operating the first test device to vary session signaling loads through said firewall includes:

operating the first test device to change a number of simultaneous ongoing communications sessions which involve signals being passed through said firewall.

* * * * *